(12) United States Patent
Williams et al.

(10) Patent No.: US 7,164,793 B2
(45) Date of Patent: Jan. 16, 2007

(54) PEN-BASED HANDWRITTEN CHARACTER RECOGNITION AND STORAGE SYSTEM

(76) Inventors: David R. Williams, 676 Parkwood La., Pomona, CA (US) 91767; Kathie S. Richter, 468 W. Alvarado, Pomona, CA (US) 91768

( * ) Notice: Subject to any disclaimer, the term of this patent is extended or adjusted under 35 U.S.C. 154(b) by 80 days.

(21) Appl. No.: 11/111,248

(22) Filed: Apr. 20, 2005

(65) Prior Publication Data

US 2005/0185842 A1    Aug. 25, 2005

Related U.S. Application Data

(63) Continuation of application No. 09/755,763, filed on Jan. 5, 2001, now Pat. No. 6,968,083.

(60) Provisional application No. 60/175,127, filed on Jan. 6, 2000.

(51) Int. Cl.
*G06K 9/00* (2006.01)

(52) U.S. Cl. ..................... 382/187; 382/188

(58) Field of Classification Search ............... 382/100, 382/181, 183, 186–189; 341/13; 345/173
See application file for complete search history.

(56) References Cited

U.S. PATENT DOCUMENTS

| | | | |
|---|---|---|---|
| 3,145,367 A | 8/1964 | Crane | 340/146.3 |
| 3,182,291 A | 5/1965 | Nassimbene | 340/146.3 |
| 3,462,548 A | 8/1969 | Rinder | 178/18 |
| 3,906,444 A | 9/1975 | Crane et al. | 340/146.3 SY |
| 3,930,229 A | 12/1975 | Crane et al. | 340/146.3 SY |
| 3,986,403 A | 10/1976 | Hurd et al. | 73/432 R |
| 4,241,409 A | 12/1980 | Nolf | 364/705 |
| 4,495,646 A | 1/1985 | Gharachorloo | 382/13 |
| 4,646,351 A | 2/1987 | Asbo et al. | 382/3 |
| 4,653,107 A | 3/1987 | Shojima et al. | 382/13 |
| 4,751,741 A | 6/1988 | Mochinaga et al. | 382/13 |
| 5,022,086 A | 6/1991 | Crane et al. | 382/2 |
| 5,027,115 A | 6/1991 | Sato et al. | 341/13 |
| 5,210,405 A | 5/1993 | Toyoda et al. | 250/221 |
| 5,215,397 A | 6/1993 | Taguchi et al. | 401/194 |
| 5,291,213 A | 3/1994 | Krauss | 345/179 |
| 5,294,792 A | 3/1994 | Lewis et al. | 250/22 |
| 5,397,865 A | 3/1995 | Park | 178/18 |
| 5,432,720 A | 7/1995 | Lucente et al. | 364/708 |
| RE35,016 E | 8/1995 | Gullman et al. | 73/862 |
| 5,491,758 A | 2/1996 | Bellegarda et al. | 382/187 |
| 5,509,087 A | 4/1996 | Nagamine | 382/188 |

(Continued)

*Primary Examiner*—Vikkram Bali
(74) *Attorney, Agent, or Firm*—Anna M. Vradenburgh; Koppel, Patrick & Heybl

(57) ABSTRACT

The present invention is directed to an improved system and method in which a pen-sized and shaped device detects, recognizes and stores handwriting as it is written by the device. The invention employs both an active feedback network and a character recognition methodology of partitioning detected input into character components. The active feedback network continually monitors device output to determine the sufficiency of the data input. If the data input is insufficient, the device modifies its detection methodology to obtain data the device readily recognizes. Data recognition is performed in multiple asynchronous processes. Elements of individual characters are sampled by the detector. Character elements are processed and recognized on this elemental level. Recognized character elements are stored for subsequent assembly and recognition on a character level. Thus, preferably two recognition sub-processes take place, one on a character element level and another on a character level.

17 Claims, 18 Drawing Sheets

U.S. PATENT DOCUMENTS

| | | |
|---|---|---|
| 5,533,141 A | 7/1996 | Futatsugi et al. ............ 382/119 |
| 5,592,565 A | 1/1997 | Shojima et al. ............. 382/185 |
| 5,614,926 A | 3/1997 | Shigematsu et al. ........ 345/156 |
| 5,764,797 A | 6/1998 | Adcock ....................... 382/187 |
| 5,774,602 A | 6/1998 | Taguchi et al. ............. 382/314 |
| 5,781,661 A | 7/1998 | Hiraiwa et al. ............. 382/188 |
| 5,832,113 A | 11/1998 | Sano .......................... 382/187 |
| 5,861,876 A | 1/1999 | Nakayama .................. 345/179 |
| 5,892,824 A | 4/1999 | Beatson et al. ............... 380/25 |
| 6,567,076 B1 | 5/2003 | Yeh ............................ 345/173 |
| 6,968,083 B1 * | 11/2005 | Williams et al. ............ 382/187 |

* cited by examiner

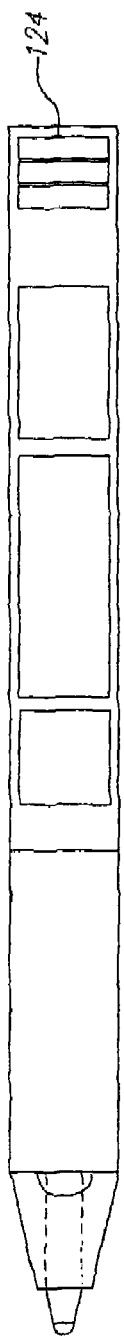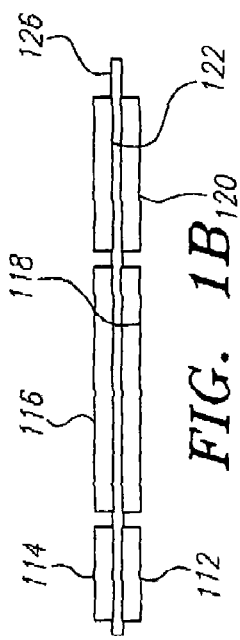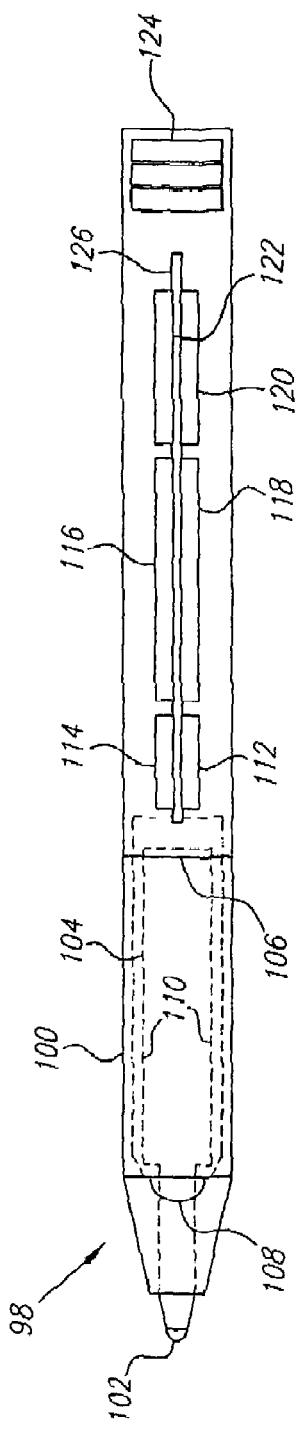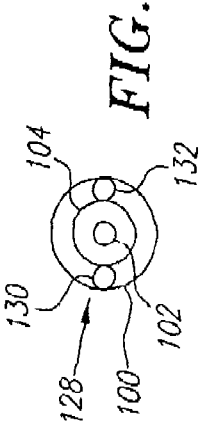
FIG. 1A
FIG. 1B
FIG. 1C
FIG. 1D

| # | stroke | # | stroke | # | stroke |
|---|---|---|---|---|---|
| 1 | \ | 10 | ſ | 19 | ′ |
| 2 | / | 11 | ( | 20 | ⌒ |
| 3 | \| | 12 | ) | 21 | ʏ |
| 4 | — | 13 | ⊓ | 22 | ⨯ |
| 5 | ⊓ | 14 | ⌒ | 23 | ⨯ |
| 6 | ⊔ | 15 | ⟍ | 24 | ⌒ |
| 7 | \ | 16 | ⟋ | 25 | ⌣ |
| 8 | ⌒ | 17 | ſ | 26 | ヽ |
| 9 | ⟍ | 18 | ( | 27 | • |

FIG. 3B

PEN-BASED HANDWRITTEN CHARACTER RECOGNITION AND STORAGE SYSTEM

RELATED APPLICATIONS

This application is a continuation of U.S. patent application, Ser. No. 09/755,763 entitled Pen-Based Handwritten Character Recognition and Storage System filed on Jan. 5, 2001 now U.S. Pat. No. 6,968,083, and claims the benefit thereof. This application further claims the benefit of U.S. patent application, Ser. No. 60/175,127 entitled Pen-Based Handwritten Character Recognition and Storage System, filed on Jan. 6, 2000. Each is fully incorporated herein by reference.

BACKGROUND OF THE INVENTION

1. Field of the Invention

The field of the present invention relates to portable data entry and storage devices. In particular, the invention relates to pen-based devices that produce, recognize and store handwriting.

2. Background

In recent years, many products have been developed that attempt to feature the simplicity and ease of a pen and paper at recording information while enabling the ready transfer of such information to computers and other information systems. Very often people initially commit their thoughts to paper only to find themselves having to reenter the information into a computer or other electronic device. One development effort that in part seeks to eliminate the task of retyping is the development and commercialization of character recognition (both optical and non-optical) software. Such software was developed to bridge the gap between the handwritten word on paper and the computer-readable and transferable representation of the word. While many such packages have been successfully commercialized, they also have inherent limitations. First, to use character recognition software, a page scanning system must initially capture information on a page. Thus, a scanning element is necessary to enable the character recognition software to perform its function. Second, the combination of the character recognition software and the page-scanning system become new elements that are added to the information transfer process. That is, they do not replace the pen and paper, but instead, introduce new task elements that replace rather than eliminate the task of reentering information.

On another front, portable digital assistants (PDAs) such as the Palm V™ by 3Com, Inc. have been commercialized in attempt to replace the need for pen and paper and eliminate the need to reenter information. However, when compared to pen and paper in terms of the ease with which to record information, they too are often impractical. While such devices have continually improved in terms of flexibility and performance, they remain relatively inflexible and limited in terms of the manner and type of information that can be entered and recorded. A structured writing style is often required that can reduce writing speed. Further, PDAs are bulkier than pens in that an electronic writing template is a necessary part of the device. Also, PDAs require a measure of training of the user to be useful. Thus, in these systems, to capably record information in a computer-readable format, much of the flexibility and ease of writing on paper by hand is sacrificed.

However, recently, numerous devices and systems have been described that claim to provide the recordation flexibility of pen and paper with the capability of storage in a computer-readable format. These devices are or use pen-like devices that, in real-time, store as computer-readable data, information as it is written on a paper medium.

Examples of such a device are disclosed in U.S. Pat. No. 5,774,602 issued to Taguchi et al. ("the '602 patent") which is incorporated herein by reference. The '602 patent describes a writing device that uses a CCD detector to sense the handwriting written using the device. The device includes a microprocessor for converting the sensor's output into image data, a storage device for storing the image data, an output for downloading the image data, a stress sensor and a power supply. Similarly, U.S. Pat. No. 5,294,792 issued to Lewis et al. ("the 792 patent") and incorporated herein by reference, describes a self-contained pen-computer that acquires data representative of written strokes of a stylus of a pen and then recognizes the symbols associated with the pen strokes. The recognized symbols are stored in a memory contained in the pen and are transmitted to a host computer using a transmitter integrated into the pen.

The devices disclosed in the '602 and '792 patents and others previously developed in the field of pen-based handwriting storage suffer from certain serious drawbacks. First, while many of the disclosed devices allow for initial training of a device before use to enhance the recognition performance for a specific user, the devices disclosed are limited to a particular writing regimen or style once use commences. After they are configured to a certain user, even the trainable devices such as the device disclosed in the '792 patent, require that the specific user maintain a specific writing style that a device is designed to recognize. If the user deviates from the device's operational requirements, the device's performance markedly drops. Thus, a need exists for a device that is not constrained to a particular writing style or writing structure.

As another drawback, the highest performance character recognition devices, including many PDAs, tend to require user-specific training to achieve their recognition performance levels. By tailoring each device to a particular user, the portability or transferability of any given device becomes greatly limited because the performance degrades rapidly as the use migrates from the use the device was trained to recognize. Thus, a need further exists for a device the performance of which is not limited to a narrow recognition scheme that restricts its portability between users.

Further, the devices disclosed in the prior art such as those in the '602 and '792 patents, invite a host of undesirable consequences because of the design philosophy that they adopt in performing character recognition. By recognizing text on a character-by-character basis, the devices described demand additional, larger, and/or higher power-consuming components. In the context of a pen-based real-time handwriting recognition system, such demands are completely inapposite to the inherent limitations of a pen-like device. The enormous variability in the handwritten representation of any given character requires that a device that adequately performs recognition on a character level have a significant processing and character reference storage capability. Such demands readily lead to implementations that compromise the need for such devices to be low power and of a size and shape that is not far removed from the conventional ballpoint pen. Thus, a need exists for a device that employs a character recognition methodology that meets the practical constraints inherent in a viable pen-based handwritten character recognition and storage device.

SUMMARY OF THE INVENTION

The present invention is directed to an improved system and method in which a pen-sized and shaped device detects, recognizes and stores handwriting as the handwriting is written by the device in real-time. To meet the needs described above, the present invention first employs an active feedback mechanism in the device. By employing an active feedback mechanism, if a user of the device modifies his or her writing style while the device is in use, the device adapts, in real-time, to the new writing style. Similarly, if a new user uses the device, the device adapts to the writing style of the new user. The active feedback mechanism continually monitors the output of the device to determine the sufficiency of the data that is input. The sufficiency of the input is preferably guided by the sampling rate of the input. If the device detects that the quantity of data output is insufficient, the device modifies its detection to effect a sampling rate that is representative of the data that the device readily recognizes.

Also, the present invention partitions detected input into components of characters, i.e. strokes that in combination form a character. By partitioning data into character components, the data processing, recognition and storage complexities and requirements are simplified such that the size, shape and power limitations for the device need not be compromised. The partitioning of data is the basis of a pyramidal recognition process. Data is sampled from the detector such that the initially processed input represents character elements. Character elements are initially processed and recognized on this elemental level. Once recognized, recognized character elements are stored for subsequent assembly and recognition on a character level. Thus, preferably two recognition sub-processes take place, one on a character element level and another on a character level.

BRIEF DESCRIPTION OF THE DRAWINGS

FIG. 1A is a diagram depicting a top view of a preferred pen-based writing storage system.

FIG. 1B is a diagram depicting a side view of a preferred printed circuit board layout for a preferred pen-based writing storage system.

FIG. 1C is a diagram depicting a side view of the preferred pen-based writing storage device.

FIG. 1D is a diagram depicting a head on view of the preferred pen-based writing storage device.

FIG. 3B is a table depicting an example of an index of possible quadrature components.

DETAILED DESCRIPTION OF THE PREFERRED EMBODIMENTS

Figure 1E:
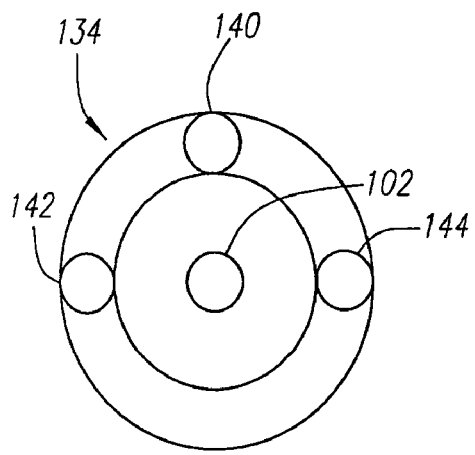
FIG. 1E is a diagram depicting a head on view of an alternative embodiment for the detection system in the preferred pen-based writing storage device.

FIGS. 1A–D depict several views of a preferred hardware configuration for a pen-based handwriting detection, recognition and storage device 98. FIG. 1A is a top view of the device 98 which is preferably comprised of a pen body 100, a pen point 102, a pen cartridge body 104, a snap body 106, a recess for an optical path 108, an optical input/output data path 110, an optical analog-to digital (A/D) input buffer 112, a programmable clock 114, a primary application-specific integrated circuit (ASIC) 116, a secondary ASIC 118, a read-only memory (ROM) 120, other memory 122, and battery cells 124. The pen body 100 is preferably of a size and shape that is no larger than a large pen, i.e. about ½ in diameter and about six inches in length. Near the last ¾ of the length of the pen body 100, the pen body 100 preferably has a cone-like shape that narrows in diameter to the pen point 102. The ink cartridge contains standard amount of ink. The pen body 100 is preferably made from or coated with an electrically insulating material such as plastic, and may be for example, polyamide, polypropylene, or polyvinylchloride. The pen cartridge 104 is preferably positioned near the pen point 102 and provides ink for the pen point 102. The snap body 106 is a means for separating the pen body 100 near its center to enable removal or replacement of the pen cartridge 104. The top end of the pen body 100 preferably opens for access to or removal of the battery cells 124.

FIG. 1B is a side view showing a preferred printed circuit board (PCB) 126 on which are the chips for the electronic components including the programmable clock 114, the optical A/D buffer 112, the primary and secondary ASICs 116, 118, and the memories 120, 122. FIG. 1C is a side view of the device 98 in which the PCB 126 is viewed from its side. The PCB 126 provides for communication between the components. The PCB 126 is preferably positioned along a radial line through the central axis of the pen body 100. By so positioning the PCB 126, space is provided to position the components on opposing sides of the PCB 126 without contacting the pen body 100 or requiring a pen body 100 with a larger diameter. Additionally, such positioning is preferably designed to allow the weight and feel of the device 98 to more closely resemble that of a traditional pen. The primary and secondary ASICs 116, 118 perform separate and asynchronous signal recognition processing tasks. In performing their respective processing tasks, the ASICs communicate bidirectionally.

FIG. 1D is a head-on view depicting the elements of a detector subsystem 128 for a preferred embodiment of the device 98. The detector subsystem 128 preferably includes a photo emitter 130 and a photo detector 132 that are preferably positioned on opposing sides of the pen point 102. The photo emitter 130 preferably emits a pulsed infrared signal that is, at least in part, reflected from the writing surface to the photo detector 132 which tracks the position of the pen point 102. The photo emitter preferably pulses between about 40 kHz and about 100 kHz. Alternatively, the photo emitter emits a non-pulsed constant infrared signal. The optical data path 110 preferably runs along the inner surface of the pen body 100 and provides the data I/O connection between the PCB 126 and the detector subsystem 128. The signal received by the photo detector 132 is transmitted along the optical data path 110.

Figure 1F:
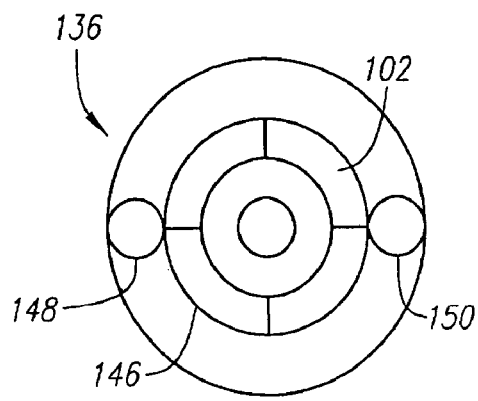
FIG. 1F is a diagram depicting a head on view of an alternative embodiment for the detection system in the preferred pen-based writing storage device.
Figure 1G:
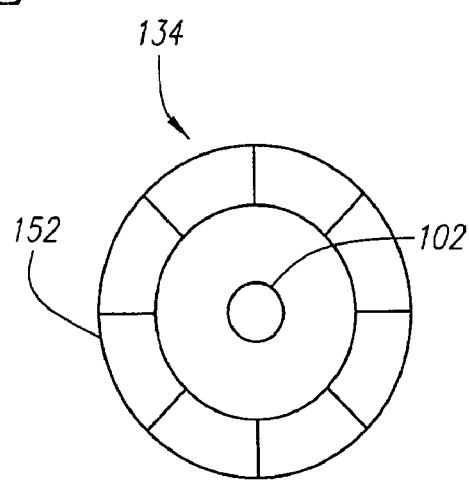
FIG. 1G is a diagram depicting a head on view of an alternative embodiment for the detection system in the preferred pen-based writing storage device.

FIGS. 1E–G depict head on views of alternative embodiments of the detector subsystem 134, 136, 138 for the pen-based writing and storage device that also use photo emitters and photo detectors. FIG. 1E depicts a single photo emitter 140 and two photo detectors 142, 144. FIG. 1F depicts a multi-segment photo emitter 146 and two photo detectors 148, 150. FIG. 1G depicts an array 152 comprised of at least one photo emitter and at least one photo detector. Preferably, the array 152 comprises up to eight (8) photo emitters and up to eight (8) photo detectors. The number of each element in the array 152 is preferably complimentary to the number of the other element. For example, a device configured with six detectors preferably has one or two emitters. In another example, a device with two detectors may have from one to 6 emitters—it may be impractical to load a detector device array with more emitters than detectors. This emitter adaptation uses a taller package to host the emitter/detector arrays. In each of these alternative embodiments, the photo emitters and the photo detectors preferably operate as previously described, and where more than one photo detector is employed, the device preferably includes a comparator (not depicted) for each photo detector employed.

As will be discussed in more detail, the device 98 preferably detects and recognizes handwriting based on the relative X-Y movements of the pen point 102 as would be produced during writing. In order to appropriately detect and recognize the written characters, the device 98 may employ one or more methods to ensure correct orientation in relation to the detected handwriting. One such preferred method is to have the device 98 self-orient upon initialization. Self-orientation comprises having the user write a pre-specified sample letter and the device, using the sample letter as a reference for orientation. As an alternative or additional option, the pen is ergonomically contoured to be held by a user in a particular orientation.

Figure 1H:
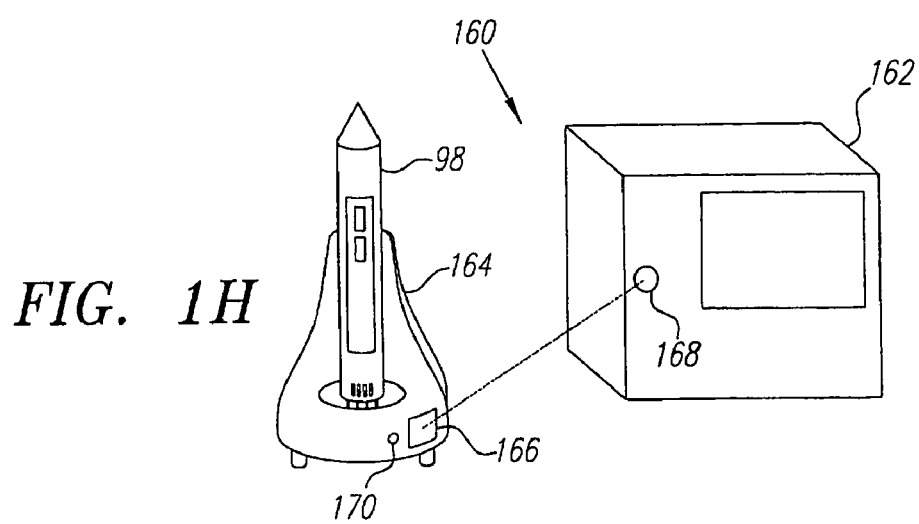
FIG. 1H is a diagram depicting a pen-based writing storage device positioned in a cradle for communication of stored handwritten data to a computer.

In a preferred embodiment, when the device 98 is to be secured for nonuse, requires recharging of the battery cells, or contains data that is desired to be transferred to a computer or other electronic data storage device, the device 98 may be placed in a holder that performs these functions. FIG. 1H depicts a preferred embodiment of a system 160 for interfacing the device 98 with a computer 162 via a device cradle 164. The device cradle 164 preferably includes an infrared transmitter 166 to enable preferably linear mass data dumps of handwritten character data, preferably already converted into a standardized form, from the device 98 to the computer 162. The computer 162 preferably includes an infrared receiver 168 to receive data transmitted from the transmitter 166 and electronic memory storage to store received data. Alternatively, any wired or other wireless mechanism for transmitting the data from the device 98 to the computer 162 is used. Further, the computer 162 may be any device that may receive and store data. Once stored by the computer 162, data that has been received may be error-checked, manipulated or reformatted in any manner desired by the user of the system 160. Optionally, the data is manipulated using any known text-editing application. The device cradle 164 preferably includes a button 170 or, alternatively, another form of actuator to enable the initiation of data transmission. In an alternative embodiment, the data transmission function of the device cradle 164 is incorporated into the device 98, allowing the device 98 to transmit data. directly to the computer 162. The preferably simplified design that allows device 98 to have a relatively small size readily enables alternative embodiments that feature functional extensions to the device 98, including a data transmission function. In such an embodiment, the data transmission function is performed by incorporating into the device 98 an infrared, or alternatively, an radio frequency (RF) transmitter. In another alternative embodiment, if the transmitted data is not in a recognized character format, the computer 162 includes software to convert received data into data in a standard character format such as ASCII.

Figure 2:
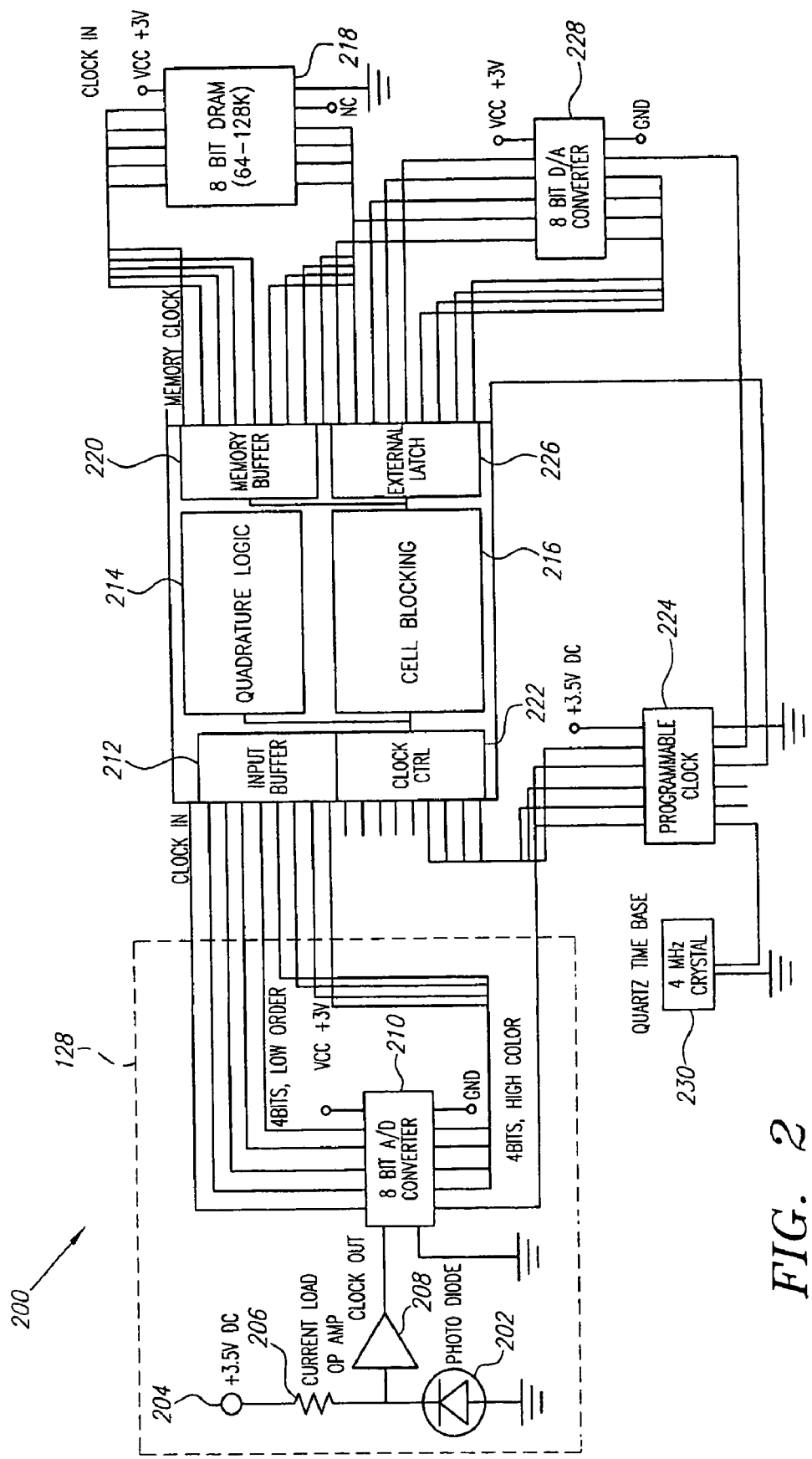
FIG. 2 is a schematic of a circuit for the preferred pen-based writing storage device depicted in FIGS. 1A–D.

FIG. 2 depicts a detailed circuit schematic 200 preferably implemented in the detector subsystem 128 and on the PCB 126 for a preferred embodiment of the pen-based writing storage device 98. In FIG. 2, the photo-detector is a photodiode 202 powered using a preferably 3.5-volt DC power source 204 and resistor 206 combination. Since in the preferred embodiment the photo emitter 130 emits a pulsed light signal, the photodiode 202 will detect spectrally reflected light. However, in the alternative embodiment in which the photo emitter 130 emits a non-pulsed light signal, the photodiode 202 will detect a diffusely reflected light.

Light input into the photodiode 202 results in an analog signal input that indicates the X-Y movement of the pen point 102 of the device 98. The analog signal preferably is then amplified by an op-amp 208 that then feeds a preferably eight-bit A/D converter 210 on the PCB 36. The A/D converter 210 preferably converts the amplified analog signal to an 8-bit digital sample. The 8-bit A/D converter 210 preferably includes pins for ground, a pin to receive power from a 3-volt source, Vcc, a pin to receive an input clock signal, a pin to transmit an output clock signal, and a pin to transmit each of the bits that represent the signal. In FIG. 2, the eight bits produced by the A/D converter 210 and the output clock signal are input to an input buffer 212 for a processor that is preferably comprised of primary and secondary ASICs 214, 216. Alternatively, the processor is implemented as a single ASIC or more than two ASICs. As another alternative, some or all of the processing is implemented with other hard-wired circuitry such as a field-programmable gate array (FPGA) or other logic device. In another alternative embodiment, if the size and power limitations are met, the processor is a general purpose central processing unit (CPU) wherein the processing logic is implemented in software. Furthermore, the processor alternatively represents multiple processors that perform different processing tasks or have the same tasks distributed between processors. Thus, as used herein, the term "processor" refers to any computational devices or means that meet the processing requirements and the size and power preferences of the device 98.

However, in the preferred embodiment depicted in FIG. 2, the input buffer 212 buffers the input to the primary ASIC 214, which has the task of performing quadrature component logic operations on the digital input data signal. The quadrature logic operations are steps to characterize or identify the input signal as an element of a character. By doing so, the data that is thereafter processed is greatly simplified as the input data is characterized as preferably one of a reference set of strokes. Preferably, the input buffer 212 is loaded when two A/D clock cycles are completed. The input buffer 212 is sized to allow for dynamic changes in the frequency and resolution of input data because preferably possible dynamic increases in sampling frequency result in more data that is input to the buffer 212 for each base clock cycle of the device 98. When the input buffer 212 has acquired a sufficient amount of data, the input buffer 212 preferably sets a flag for the primary ASIC 214 to commence quadrature logic operations on the buffered data.

The reference set of strokes is preferably stored in and accessed from an 8-bit dynamic random access memory (DRAM) 218, preferably with a memory capacity of between 64 k and 128 k bytes, which is estimated to be capable of holding up to approximately 60 handwritten pages of writing. As smaller, higher capacity memory is developed in the art, such memory may be used in the device 98. The DRAM 218 holds reference data after a boot-up process in which the ROM 120 (not shown in FIG. 2), which permanently holds all of the reference data and initialization data, initializes the device 98 and loads the reference data into DRAM 218. Using a memory buffer 220 electrically interposed between the primary ASIC 214 and the DRAM 218, the primary ASIC 214 reads the reference data in the DRAM 218 to enable the identification of the input data as specific character components. Moreover, the DRAM 218 may store the identified data. Preferably, the DRAM 218 also stores temporary runtime data and logarithm tables. The DRAM 218 as shown in FIG. 2, includes pins to ground, a pin to the 3-volt power source, Vcc, a pin for a clock input signal, a memory clock output signal to the memory buffer 220, and eight pins for eight bits of data I/O with the memory buffer 220.

The primary ASIC 214 also communicates with the secondary ASIC 216 and a clock control integrated circuit (IC) 222. The primary ASIC 214 transmits signals to the clock control IC 222 when the quadrature logic operations require a change in the output from the programmable clock 224 to one of the components of the device 98, preferably normally the A/D converter 210 which samples the analog input. This capability of modifying the clock reflects an overall active feedback network design for the device 98 that enables the device 98 to adapt to the different writing styles and writing speeds of different users. The clock control IC 222 processes the signals from the primary ASIC 214 and transmits preferably 4-bit clock control signals to the programmable clock 224. Thus, the clock control IC 222 provides the logic and interface for communicating with and modifying the operation of the programmable clock 224. The clock control IC 222 handles communication contention with the programmable clock 224 from the other logic components, including the secondary ASIC, and provides a standard method of clock function interaction. The clock control IC 222 also provides for synchronization between the components.

In communicating with the secondary ASIC 216, the primary ASIC 214 transmits quadrature result data to enable the secondary ASIC 216 to perform cell-blocking operations, i.e. operations to assemble the character components into an identifiable character. The secondary ASIC 216 also communicates with the primary ASIC 214 preferably along the same electrical connection, to under certain circumstances, instruct the primary ASIC 214 on the acquisition of additional data from the A/D converter 210.

Like the primary ASIC 214, the secondary ASIC 216 similarly has a connection to the clock control IC 222 for interfacing the secondary ASIC 216 with the programmable clock 224. The clock control IC 222 preferably provides synchronization between the input buffer 212 and the secondary ASIC 216. Like the primary ASIC 214, the secondary ASIC 216 also accesses the DRAM 218 via memory buffer 220 to retrieve reference data to perform comparisons with the assembled quadrature components, yet preferably operates asynchronously with respect to the primary ASIC 214. For the secondary ASIC 216, the reference data is character data stored in a character matrix in the DRAM 218. The character matrix preferably contains a list of sets of preferably four integers that correspond to a combination of preferably four quadrature components that correspond to a particular character. Each set of preferably four integers therefore preferably describes one character in the character matrix. The secondary ASIC 216 also outputs a digital representation of a recognized character to the memory buffer 220 and/or an external latch 226 which preferably buffers the output to an 8-bit D/A converter 228. The D/A converter 228 preferably includes connections from a 3-volt power source, from a ground, and from the external latch 226 that provides eight bits of digital input. The output of the D/A converter 228 is then fed to a transmitter (not shown) for output preferably to the external system 162 as shown in FIG. 1H.

The programmable clock 224, as noted above, is controlled by four clock control connections from the clock control IC 222. The programmable clock 224 also preferably includes connections from a preferably 3.5-volt power source and from ground. For its output, the programmable clock 224 provides synchronization for the ASICs 214, 216 and memory components on the PCB 126, and provides independent programmable clock signals that drive the detection of handwriting input data and the output of recognition data to the external system or the DRAM 218. The clock signals from the programmable clock 224 are continuously provided to the various components, insuring the continuous flow of data into the device 98 and safeguarding against the possibility of not capturing handwritten characters. When power is first applied to the device 98, the programmable clock 224 is initialized to a predetermined sampling and output frequency. The time base for the programmable clock 224 is preferably a 4-MHz quartz crystal oscillator 230. Preferably, at regular intervals, the clock control IC 222 resynchronizes the independent clock signals of the programmable clock 224 with the time base of the crystal oscillator 230.

Figure 3A:
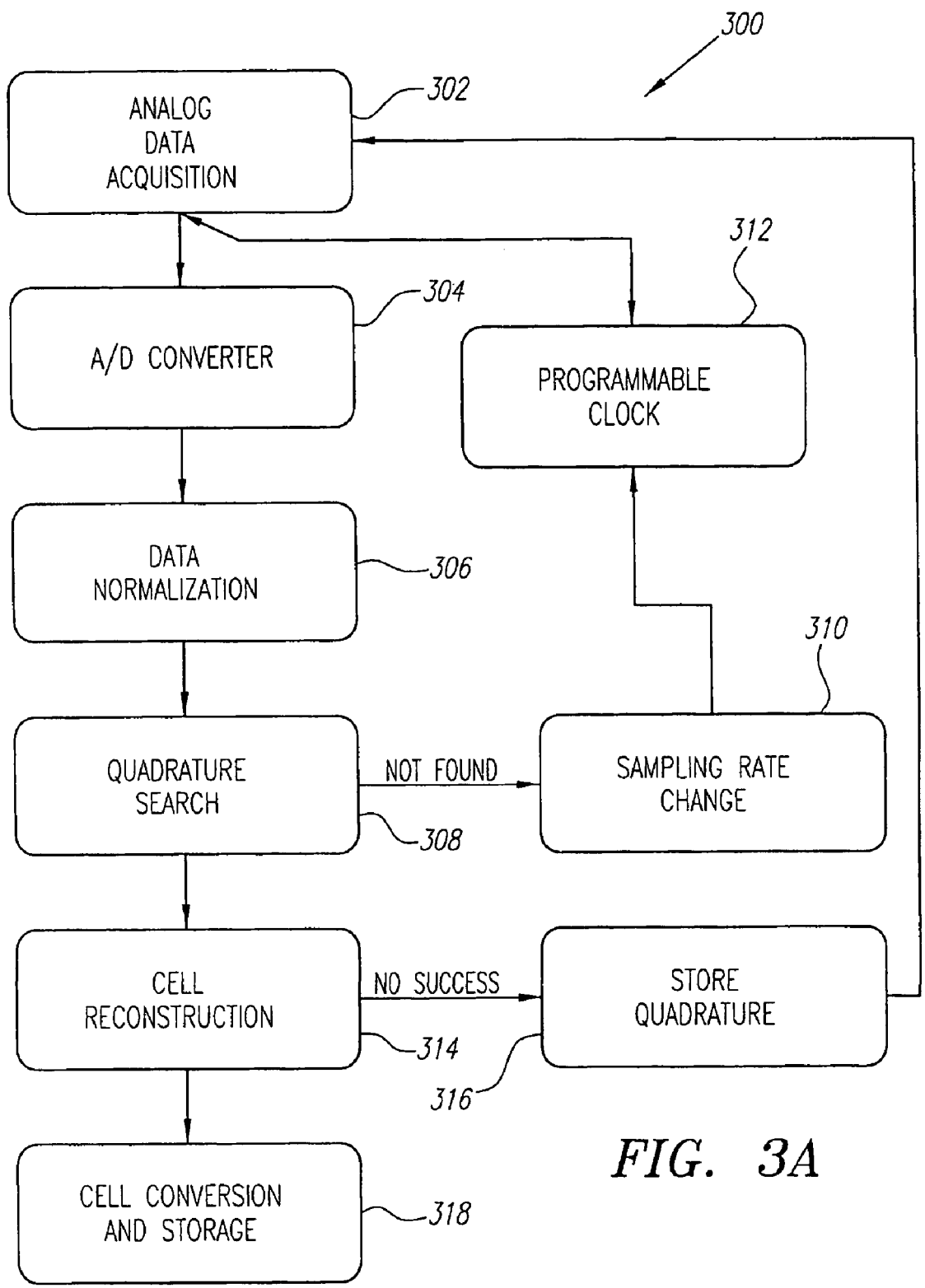
FIG. 3A is a flow chart depicting the basic steps formed by the preferred pen-based writing storage device.

FIG. 3A depicts basic steps in a preferred process 300 of recognizing and storing handwritten characters that are preferably produced on paper by the handwriting storage device 98. A first step 302 is the acquisition of analog data regarding the X-Y movement of the pen point 102 as would be produced during a writing session. The next step 304 is to convert the analog data to digital data. The sampling of the digital data is preferably at a rate that provides for the representation of a discrete "quadrature" component or stroke of a character. Quadrature components are components of characters that, in an ideal case, if combined in a group of preferably from one to four components form single characters, such as upper and lower case English letters, punctuation characters and numbers. A quadrature component of a character is preferably defined according to a discrete period of time in generating a character, whether a "null" in the generation of a character has occurred, or the length of the path in the generation of the character. Thresholds for each of these parameters may specify the bounds (in time or space) of a stroke. The "null" point normally is observed in manuscript writing where the pen point performs distinct movement in the generation of a single character.

In the next step 306, the digital data is then normalized into a form for comparison with a reference matrix of quadrature components. The reference matrix is preferably a previously generated library of quadrature component representations that are used for comparison against input data. An example of a representation of a reference matrix of quadrature components is shown in FIG. 3B. Preferably, the reference matrix contains a representation of a set of strokes that in various combinations may form every character that is commonly handwritten by the user. FIG. 3B is an example of a set of possible strokes. Beside each stroke is a stroke index that is preferably used to represent the individual strokes in the reference and character matrices. Before comparing the input data with the reference matrix of quadrature components, the data normalization step 306 preferably converts the digital data of each character component into a polynomial form or alternatively an eigenvector form. Alternatively, the normalization step 306 characterizes the component data in a standardized form by converting the data into vector representations, by performing spline fitting methods as are known in the art, or applying fast Fourier transform/wavelet operations, preferably configured to use a log table to minimize processing requirements, the output of which distinguishes between ellipses, curvatures, lines and intersections. In each case, the reference matrix represents the quadrature information in a standardized form that is in accord with the normalization processing of the input data. For example, in polynomial-based normalization step, the reference matrix stores polynomial representations of quadrature components having an ideal form or another known level of quality. Alternatively, the reference matrix stores Fast Fourier Transform (FFT) transformations of similar reference data. Regardless of the means used to implement the normalization step 306, the step 306 of converting the input data into quadrature components simplifies the subsequent processing steps and reduces the overall reference storage requirements. With the preferred polynomial representation implementation, the reference matrix stores idealized polynomial representations of character components. An advantage of this tiered recognition process is that with respect to this first tier, the process is character independent. The character components are discrete and generic such that generally they may be used in the formation of a character set representing any written language or symbology.

In the next step 308, a quadrature component search is performed. This step 308 is the first of a two-tiered recognition process that characterizes the input data in phases and simplifies the data following each stage of recognition. In the polynomial-based implementation, once the data has been represented in polynomial form, the polynomial coefficients for the data are compared to the polynomial coefficients that are used in the reference matrix to represent the. complete set of quadrature components. By representing the data and the references as polynomial coefficients the process of comparison between them is greatly simplified. Preferably a closest match type of comparison is used to identify the polynomial-represented stroke.

In the eigenvector-based implementation, the set of eigenvectors is compared to a reference matrix of eigenvectors to identify the character components. Preferably, an XOR operation is performed as a comparison scheme. When the eigenvectors are identified as a particular quadrature component from the reference matrix, the identified quadrature component is propagated for further processing.

In the event that the quadrature comparison with the reference matrix cannot identify the data because the data is malformed or has been misinterpreted, then the process 300 proceeds on an alternative path that is characteristic of the active feedback design of the device 98. In the alternative path, the next step 310 preferably is to alter the detection sampling rate to attempt to acquire more easily characterized or identifiable data. Preferably, the sampling rate is adjusted by instructing the clock control IC 222 to modify the programmable clock 224, shown as step 312 in FIG. 3A. Preferably, as a temporary measure, additional bits of data are received to aid in the recognition of the quadrature component until the detection sampling rate is modified. Specifically, the primary ASIC 214 preferably additionally instructs the input buffer 212 to receive additional data into the input buffer 212 at the original sampling rate as a temporary adjustment measure until the sampling rate is modified by the programmable clock 224. For example, in the polynomial-based configuration, if only the lower order polynomial coefficients of the normalized input data do not match the reference matrix polynomial coefficients, then the detection sampling rate is preferably reduced. On the other hand, if higher order coefficients of the normalized input data do not match the reference matrix polynomial coefficients or if they are too high, the clock speed and/or the number of bits that are received for the quadrature are preferably increased.

Preferably, once the sampling rate is modified, the number of bits sampled for each quadrature component returns to a preferred operational amount, i.e. preferably 16 or 32 bits for each quadrature component. After the step 312 of modifying the programmable clock 224, the step 302 of acquiring analog data is repeated where new analog data is sampled at the potentially modified sampling rate. As discussed below, the initially unidentified quadrature data is stored and retained for use with up to preferably three subsequent quadrature components to decipher the character that includes the unidentified quadrature component.

In relation to the above active feedback design, when the device 98 is first activated, the sampling rate for the device 98 is initially set by requiring the user to hand-write a single character such as an "S." Based on the detection, quadrature and recognition processing of the "S," the programmable clock 224 may be modified to require an increase or decrease in the data-sampling rate. By requiring an initial test pattern, the device 98 limits the amount of data that may be initially lost.

Along the first process path, where the quadrature component comparison with the reference matrix identifies the eigenvector or polynomial represented data, the process 300 performs a step 314 of reconstructing the written character based on the resolved quadrature components. This is the cell-blocking sub-process and represents a second tier of the preferred tiered recognition process 300. If the input quadrature component to the cell-blocking sub-process is the first component of a new quadrature component set representing a character, then the sub-process may not successfully reconstruct the character. In this case, the process 300 proceeds to a step 316 of storing the quadrature component. Then, the process returns to the data acquisition step 302 to enable the capture of additional data. The process steps are repeated to resolve a second and potentially third and fourth quadrature components. Each time though the process 300, an attempt is made to reconstruct the cell based on the freshly resolved quadrature component and the quadrature components that have been previously resolved and stored. Preferably, at least two quadrature components are resolved before the reconstruction step 314 is successfully performed. If the character cannot be reconstructed, then the detection sampling rate dictated by the programmable clock 224 may again be modified as part of the active feedback mechanism to improve the detection and processing efficiency. In a preferred embodiment, an LED at the base of the device 98 is lit when processed data cannot be resolved as a character. Preferably, in such an event, the user initializes the device to recommence handwriting detection by writing a predetermined initialization character, such as the "S" discussed above.

Preferably, if the cell is identified based on a set of quadrature components, the process 300 proceeds to a step 318 of converting the assembled cell to a character format and storing a digital, preferably compressed, representation of the character in memory. In that event, the quadrature memory buffer is preferably purged to allow new data for a new character to be acquired and stored.

Figure 3C:
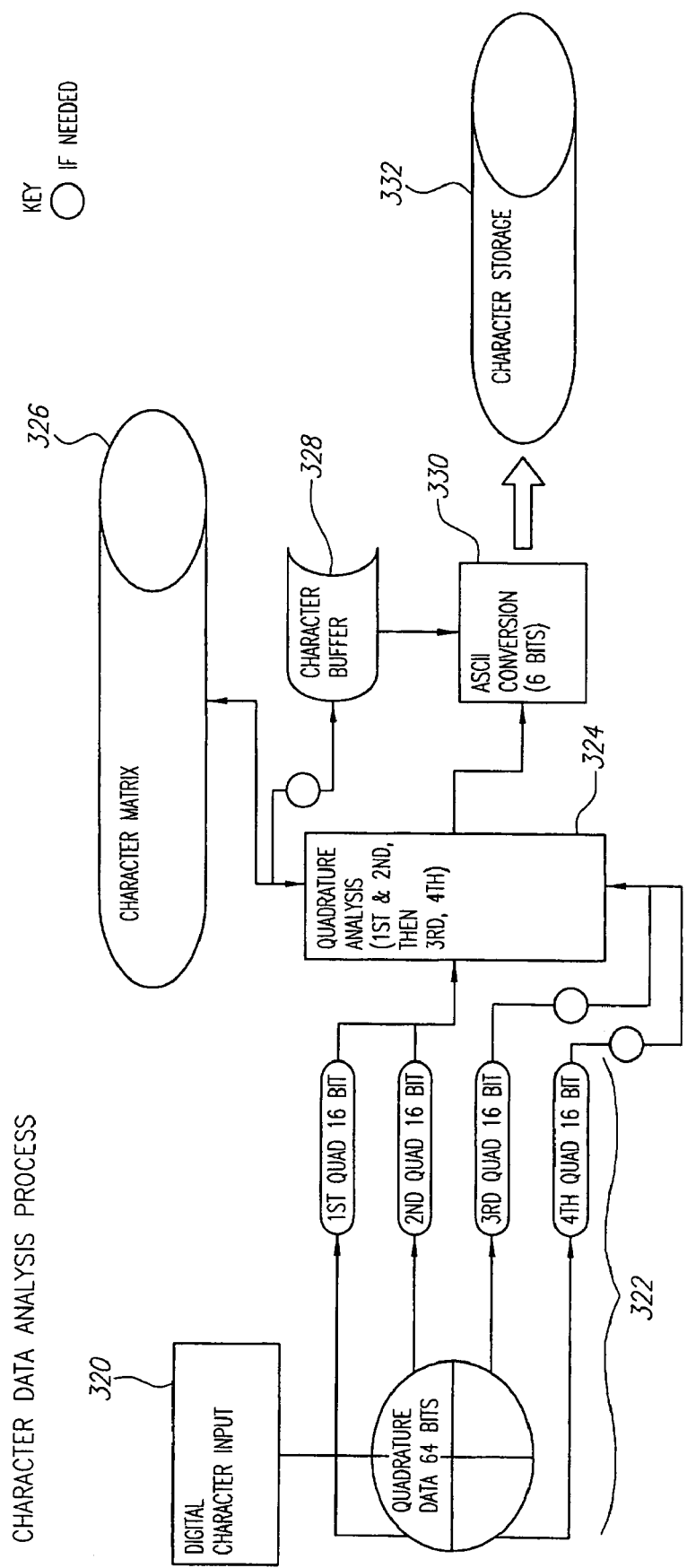
FIG. 3C depicts the functional elements in the quadrature analysis performed by the preferred pen-based writing storage device.
Figure 3E:
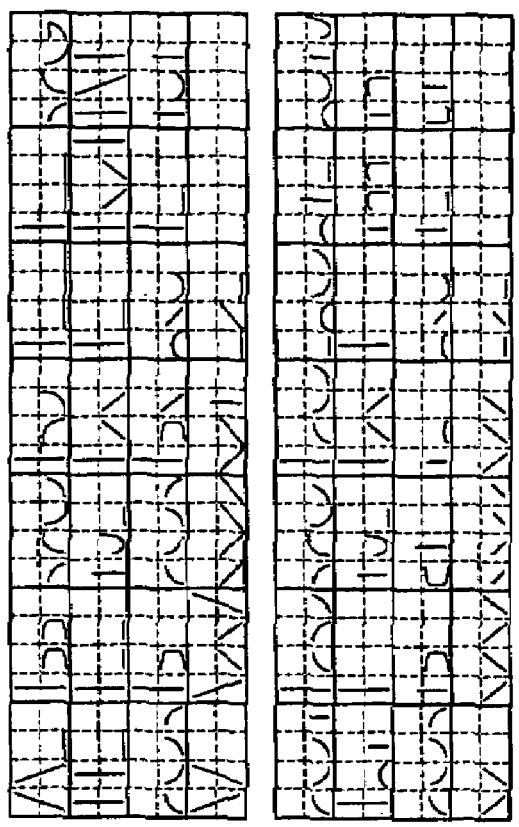
FIG. 3E is a table depicting a character set in a reference character matrix represented as a composition of quadrature components.
Figure 3D:
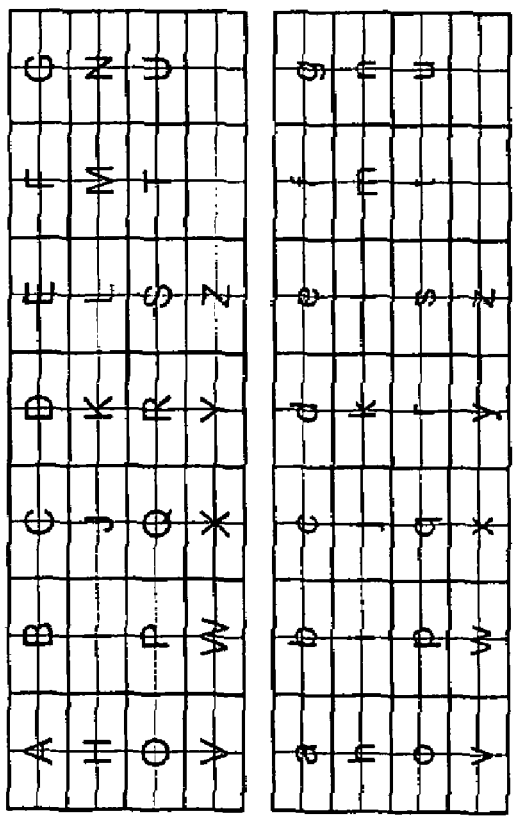
FIG. 3D is a table depicting an example of a character set that is represented in a reference character matrix.

FIG. 3C depicts the basic elements of the quadrature processing logic of step 314 in FIG. 3A. Digital representations of a character 320 are partitioned and processed on a quadrature component basis. The partitioning 322 provides the elements of the first tier recognition process or quadrature analysis 324. In the quadrature analysis 324, a first quadrature component is received. The quadrature analysis 324 preferably commences only after a second quadrature component is received. The quadrature analysis 324 then preferably attempts to identify the character based on the receipt of two quadrature components. The quadrature analysis 324 is performed by scanning a character matrix 326 that represents characters as composites of quadrature components. FIG. 3D depicts an example of a character set that is represented in the character matrix 326. The character set includes upper and lower case English characters. FIG. 3E depicts a representation of the character set in the character matrix 326 as a composition of quadrature components. If the pair of quadrature data sets cannot be identified from the character matrix 326, a third and potentially a fourth quadrature component is input to the character matrix 326 and the quadrature analysis 324 is reattempted.

Figure 3F:
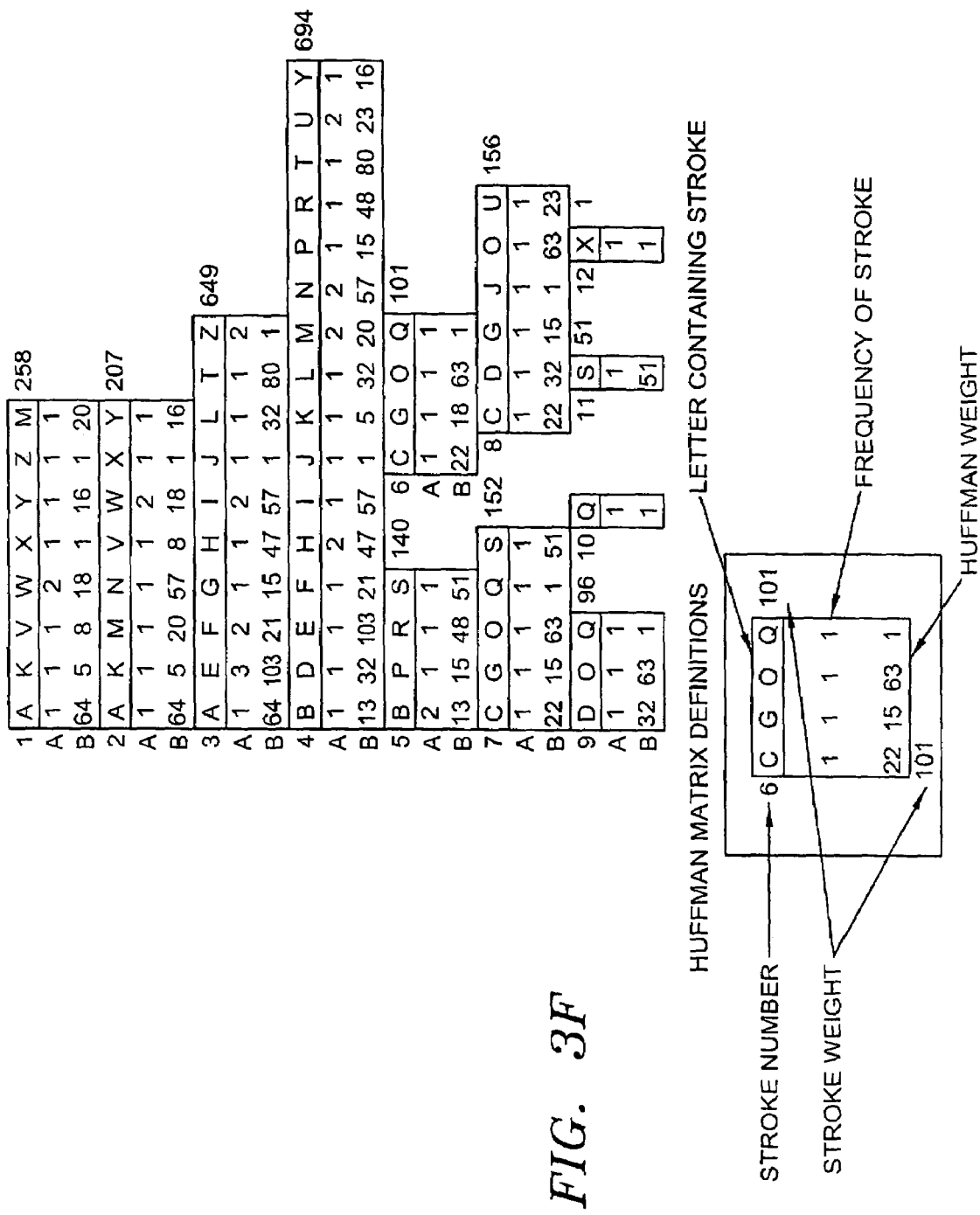
FIG. 3F depicts a set of sub-tables, one for each type of quadrature component or stroke, where each sub-table lists frequency and weighting characteristics for a set of English capital letters that generally require the stroke.

Preferably, the quadrature analysis 324 is optimized according to the frequency of certain letters being written. For example, FIG. 3F is a table comprised of a set of sub-tables, one for each type of stroke. Each sub-table lists a set of English capital letters that generally require the stroke. In each sub-table, in the row below each letter, is a stroke frequency value representing the number of times that a given stroke is written for each English capital letter, with the minimum being one (1). Such data is preferably used in the cell blocking sub-process in initially making "intelligent guesses" as to the identity of a character based on the identification of one or more quadrature components. Also in FIG. 3F, to the right of each sub-table for a stroke, is a stroke weight value representing the relative frequency in written English of the respective stroke in relation to other potential strokes. This value is preferably applied to enable the quadrature analysis to test the most likely strokes first, and thus optimize its overall efficiency. In the second row of each sub-table is a character weight. This weight reflects the frequency that a particular character is written. Like the stroke frequency value, these weights are preferably used in the cell blocking sub-process to improve the efficiency of character identification. Preferably, weighted Huffman encoding is applied in generating the stroke frequency and character weights. Further, the quadrature analysis 324 is preferably also optimized based on the likelihood of certain characters based on their likely relationship to characters that have previously been identified. Once the quadrature analysis 324 reconstructs the quadrature components into a character, that character is preferably stored in a character buffer 328 and/or converted into a 6-bit ASCII, Unicode or other character format 330 for storage in a character storage buffer 332.

Figure 4A:
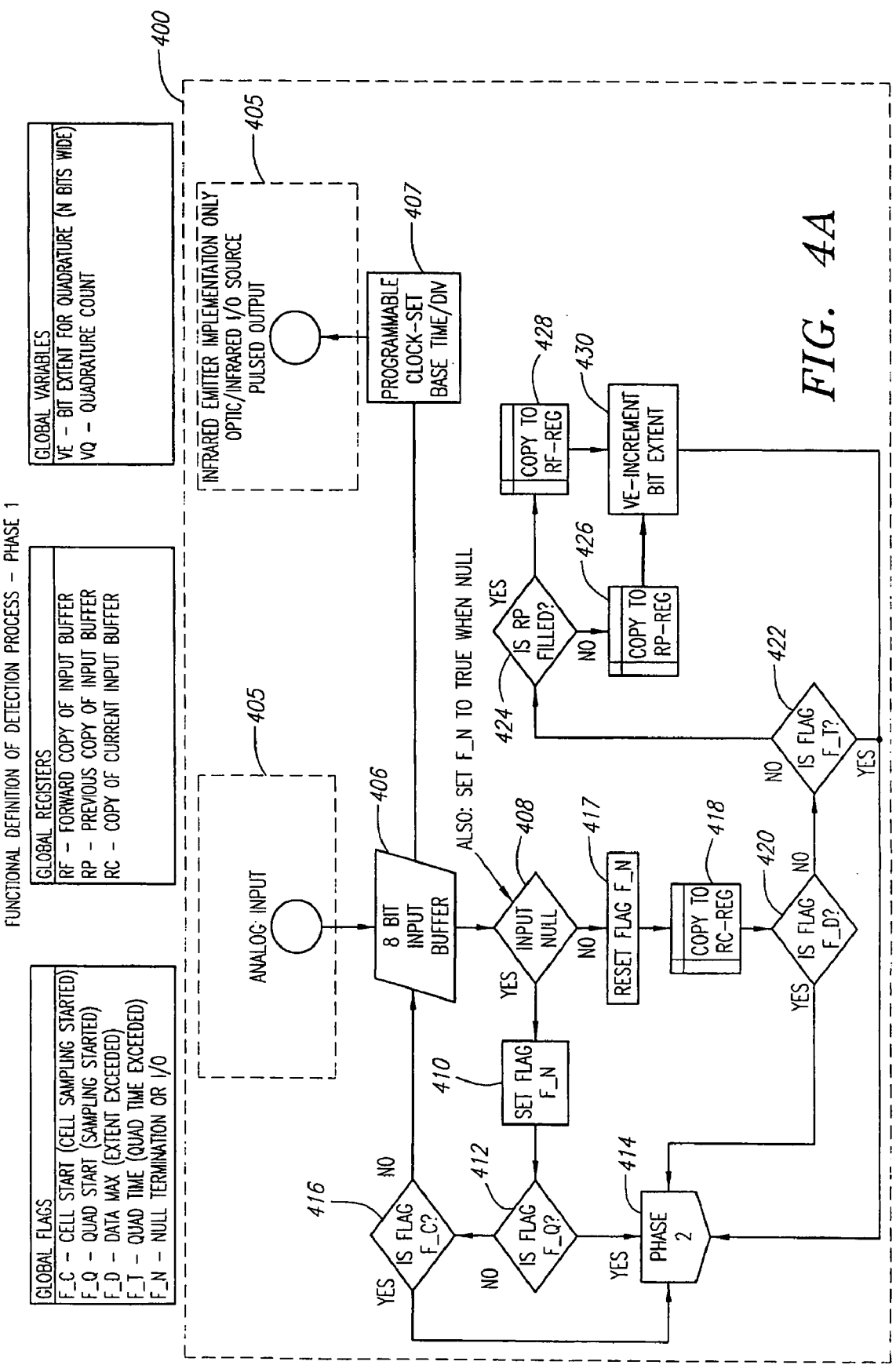
FIGS. 4A–C are flow diagrams depicting preferred specific steps performed by the preferred pen-based writing storage device in processing handwriting.
Figure 4B:
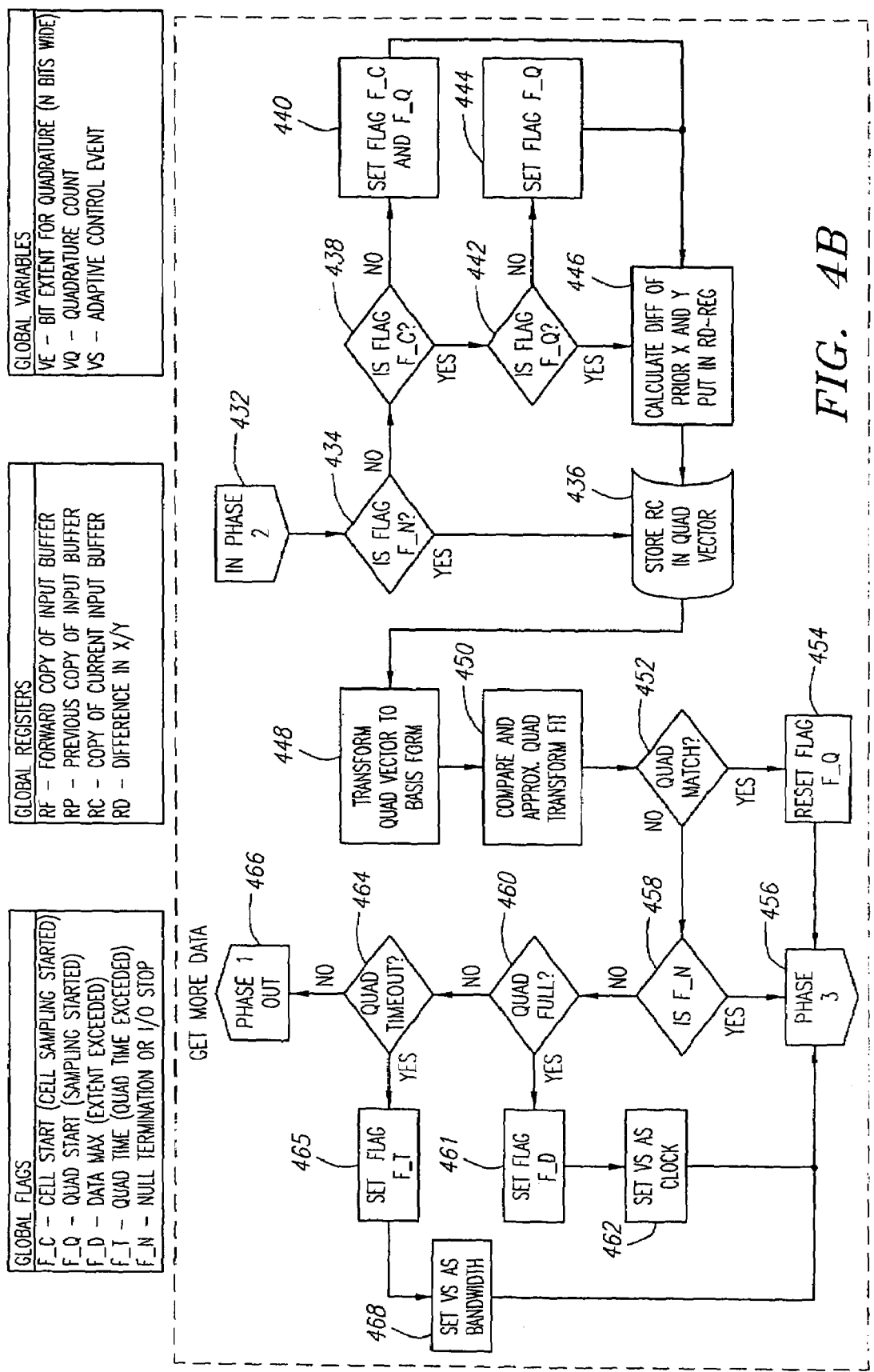
Figure 4C:
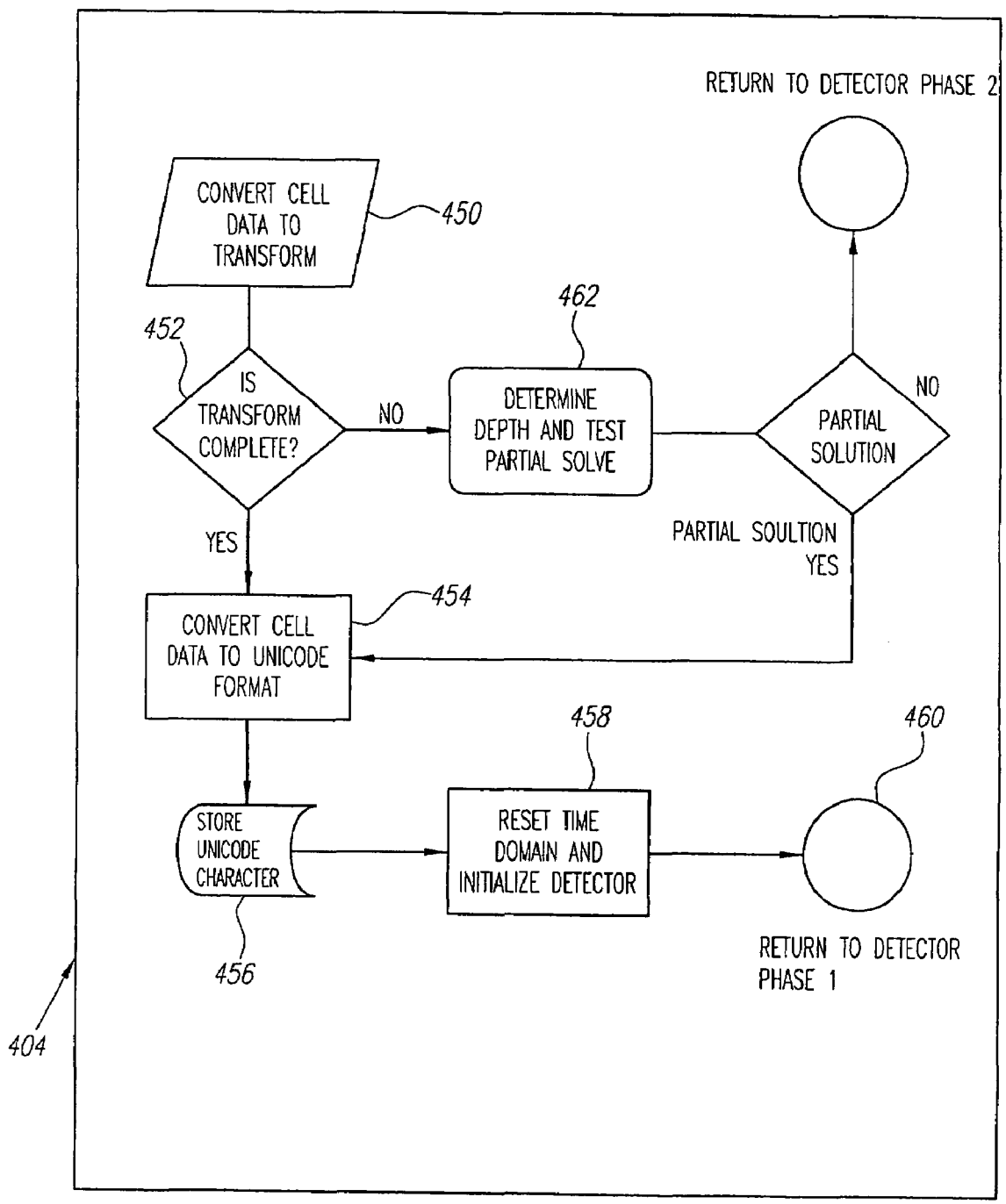

FIGS. 4A–C illustrate one embodiment of a detailed functional flow for processing handwriting in real-time in the preferred pen-based handwriting storage device 98. The functional flow is preferably divided into two sub-processes, a quadrature component or stroke detection sub-process (phases 1 and 2) 400, 402 and a cell-blocking sub-process (phase 3) 404. In the first phase of the detection sub-process, input data is received and normalized for comparison with the quadrature component reference matrix that occurs in the second phase. When the cell blocking sub-process (phase 3) 404 commences processing of the data, the process also returns to the first phase of the detection process to obtain further data. Thus, the two sub-processes preferably operate asynchronously such that a quadrature analysis can be performed on a set of data while simultaneously the cell blocking process may work to resolve the same character.

In FIG. 4A, where initially all global flags are set to "false" and all registers empty, analog data 405 is received from the detector at timed intervals according to the programmable clock 407. The data 405 is digitized and stored in an 8-bit input buffer 406. The input buffer 406 is then examined 408 to determine if any data is present. If the input buffer 406 is empty, the Null Termination (F_N) flag is set 410 to "true" to indicate that no data was received. The Quad Start (F_Q) flag is then examined 412 to determine if the empty input buffer 406 represents the start of the next quadrature. If the null data does represent the start of a new quadrature, then the empty input buffer 406 value is passed 414 into the second phase 402. However, if the null data does not represent the start of the next quadrature, then the Cell Start (F_C) flag is examined 416 to determine if the empty input buffer 406 represents the start of the next character. If the null data does represent the start of the next character, then the empty input buffer 406 value is passed 414 into the second phase 402. If, however, the null data does not represent the start of the next character, then the input buffer 406 is again examined 408 for more data. This cycle repeats itself until data is present in the input buffer 406.

When data does exist in the input buffer 406, F_N is set to "false", the data is copied 418 into a copy buffer (RC) and the Data Max (F_D) flag is examined 420 to determine if RC is full. When RC is full, the data in RC is passed 414 into the second phase 402. However, if RC is capable of storing more data, the Quad Time (F_T) flag is examined 422 to determine if the time elapsed detecting the current quadrature is such that the quadrature has been fully detected. When the quadrature has been fully detected, RC is passed 414 into the second phase. However, if the quadrature still potentially has more data to detect, the previous copy (RP) of the input buffer 406 is examined 424. If RP is empty, RC is copied 426 into RP, and if RP is full, RC is copied 428 into a forward copy (RF) of the input buffer 406. After RC is copied into either RP or RF, then the bit extent for the quadrature (VE) is incremented 430 to track the amount of data obtained for the quadrature and RC is passed 414 into the second phase 402.

In FIG. 4B, the data in RC enters 432 into the second phase 402 of the detection sub-process where F_N is first examined 434 to determine if the current quadrature has completed data. If the current quadrature has completed data, RC is stored 436 directly into the quad vector. When more data is needed to complete the current quadrature, F_C is examined 438 to determine if the data in RC represents either part of the current character or the start of the next character. If the data in RC represents the start of the next character, then F_C and F_Q are both set 440. If the data in RC represents part of the current character, F_Q is examined 442 to determine if the data represents part of the current quadrature or the start of a new quadrature. For the start of a new quadrature, F_Q is set 444. After determining what character and quadrature the data belongs to, the data in RC and the data in RP are used to calculate and store 446 the difference in X/Y coordinates in a difference register (RD). Following this calculation, RC is stored 436 in the quad vector.

Once RC is stored 436 in the quad vector, the quad vector is transformed 448 to a basis form which is compared 450 to the basis forms from the set of reference strokes and approximately fit to the closest match in the set of reference strokes. If transform can be matched 452 to a transform in the set of reference strokes, then F_Q is reset 454 to "false" to indicate that a new quadrature is being examined and the matched stroke is passed 456 into the cell-blocking sub-process (phase 3) 404. If no reasonably close match can be found for the basis transform among the set of reference strokes, F_N is examined 458 to determine if the input buffer 406 has a null value. A null value at this point indicates the end of the quadrature has been reached, and the null value is passed 456 into phase 3 404. If the data does not have a null value, the quad vector is examined 460 to determine if it is full. If the quad vector is full, F_D is set 461 to "true" and the adaptive event control (VS) is set to "clock" to indicate that the sampling rate may need to be adjusted to allow a full quadrature of data to be obtained without overflowing the quad vector. The quad vector is then passed 456 into the phase 3 404. If the quad vector is not full, then the elapsed time is examined 464 to determine if sufficient time has elapsed to detect an entire quadrature. If sufficient time has not elapsed, then phase 1 400 is reentered 466 to obtain more data. However, if sufficient time has elapsed, then F_T is set 465 to "true" and VS is set 468 to "bitwidth" to indicate that the bit-width resolution may need adjusting to more accurately obtain a full quadrature of data. The quad vector is subsequently passed 456 into phase 3 404.

In FIG. 4C, the first step in the cell-blocking sub-process 404 is to convert 470 the cell data to a transform. The next step is to determine 472 whether the transform is complete. That is, if the last quadrature component for this character has been received, then the character may be resolved. If the transform is complete, the sub-process 404 converts 474 the character to a Unicode or ASCII format, and then stores the character 476. All flags are then reset and the detector is initialized 478 for acquisition of new data. The sub-process 404 then exits and returns 480 to the first phase 400 for more input. Thus, the cell-blocking sub-process 404, at the point of completion, returns the detector systems to their initial states and is prepared to acquire new character data.

If the transform is determined 472 to be incomplete, such that an incomplete quadrature component set has been received by the cell-blocking sub-process 404, then the sub-process 404 attempts to resolve the character with the extent of data that has been received. In resolving data describing a partial character, the sub-process 404 determines 482 the depth of the data and attempts to identify the character based on the partial character data received and using the information stored in RD, RP and RF. The process attempts to determine whether a specific character is represented by the partial set of data that has been acquired.

The sub-process 404 then preferably determines 484 whether to proceed along one of preferably two paths based on whether an identification of the character was made. If the character can be identified with the partial set of data, then the sub-process 404 proceeds to the step 474 of converting the character to a Unicode or ASCII format and processes thereafter as though the transform had been complete. If the character cannot be resolved, the process waits 486 for more data from the second phase 402 of the detection sub-process. Once additional data is thereafter received in the cell-blocking sub-process 404, the sub-process 404 again determines whether the transform is complete enough to resolve the character or whether another attempt at character identification based on the availability of partial data can be performed.

Figure 5A:
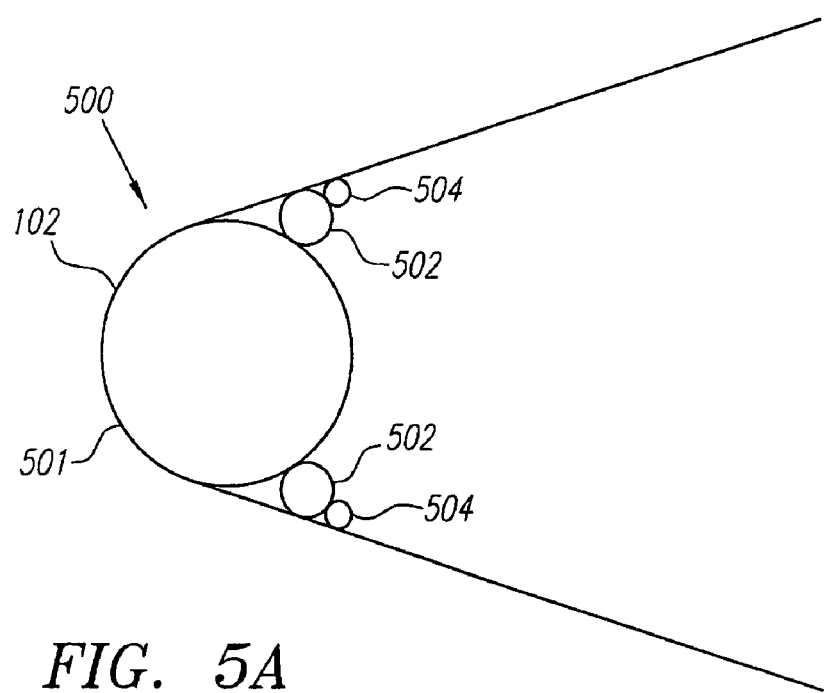
FIGS. 5A and 5B are diagrams depicting an alternative embodiment of microfeeler based detection for the detection system in the preferred pen-based writing storage device.
Figure 5B:
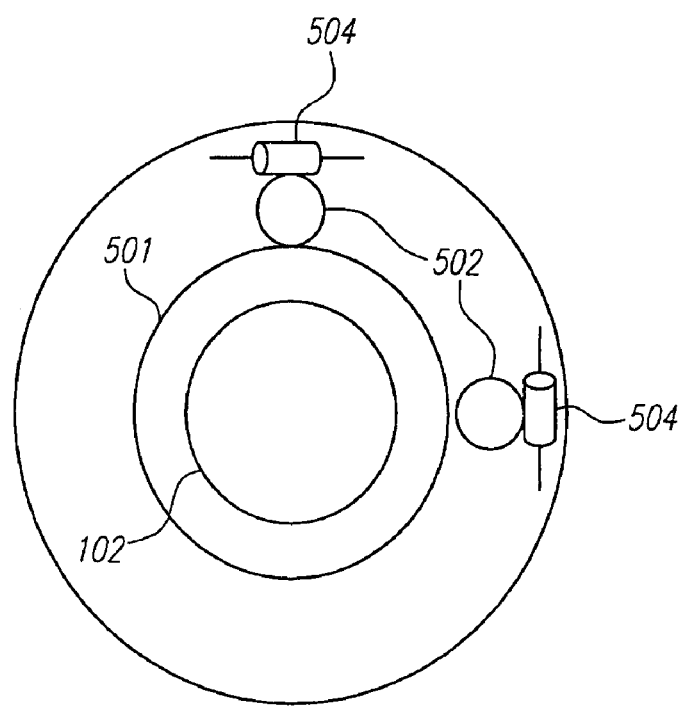
Figure 5C:
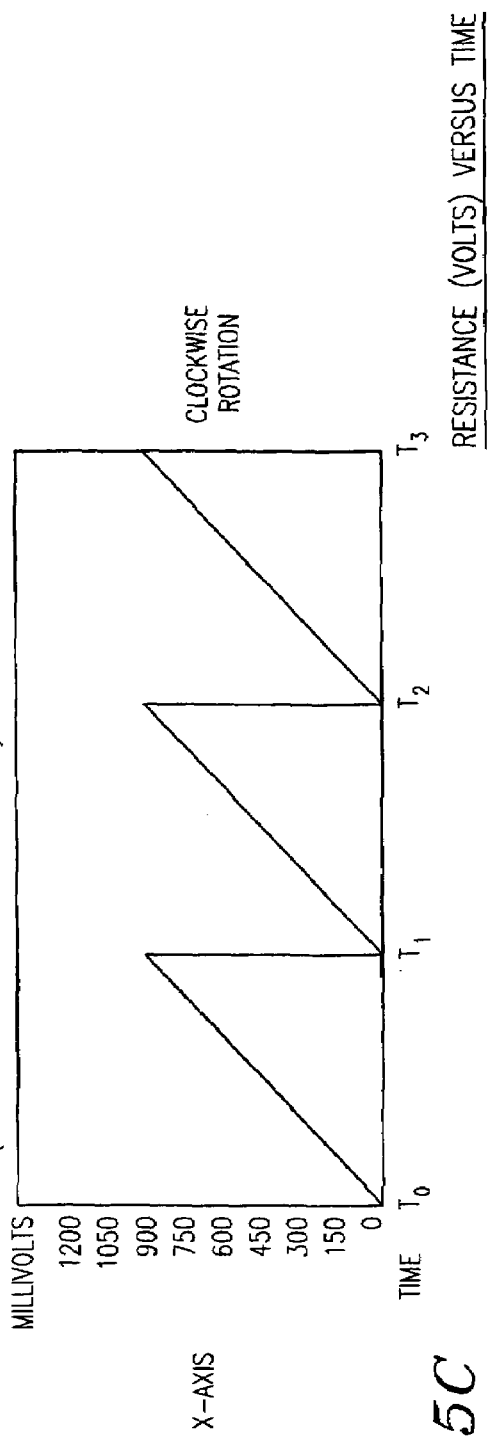
FIG. 5C is a graph depicting examples of the current output from the apparatus of FIGS. 5A and 5B.
Figure 5C:
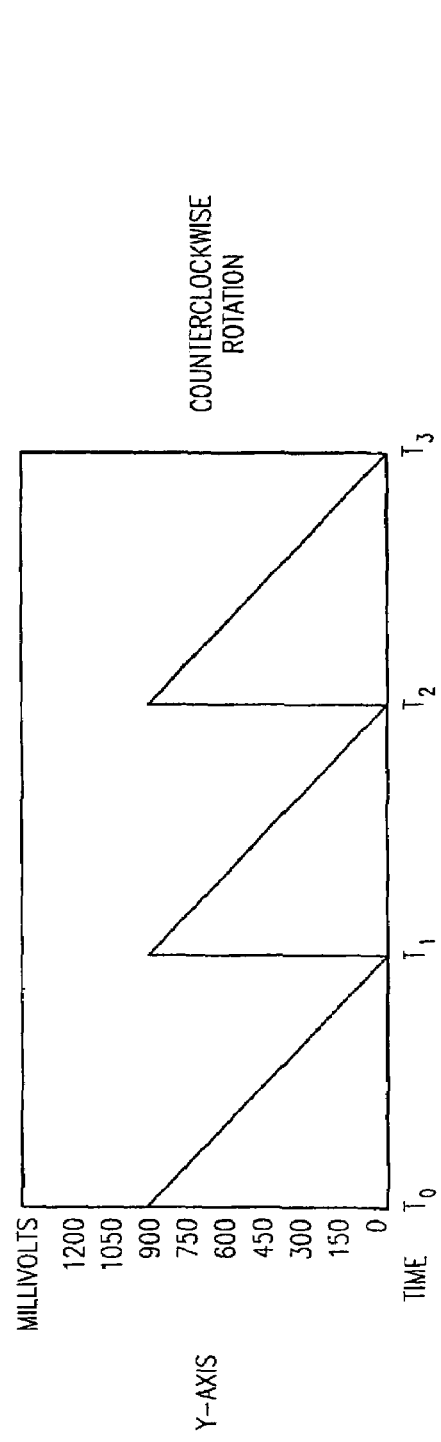

FIGS. 5A–B and 6A–D depict alternative detector subsystems for the pen-based writing storage device. FIG. 5A illustrates a mechanical microfeeler-based detector subsystem 500 as shown from a side view. FIG. 5B illustrates the same subsystem 500 as shown from a head on view. The microfeeler detector subsystem 500 is disposed at the pen tip 102, the pen tip comprising a ball 501 similar to that found in a ball point pen, and comprises two microfeelers 502, each resting against the ball 501 coupled to a surface contact 504, preferably a friction roller. Each microfeeler preferably comprises a resistive potentiometer having multi-turn cyclical output with no stops on the shaft rotation. The surface contacts 504 are used for reading resistance and impedance changes on the microfeelers 502 and are coupled to the logic circuitry of the device 98. The microfeelers 502 are preferably located 90 degrees apart relative to a z-axis, the z-axis running through the center of the device 98. Additionally, the microfeelers 502 are preferably disposed near a great circumference of the ball 501 that is normal to the z-axis. With the microfeelers 502 positioned in this way, this subsystem 500 measures ball rotation along two orthogonal axes as changes in resistance or impedance of the microfeelers 502. Therefore, the use of a microfeeler detection system 500 allows for ready determination of when the pen tip 102 is actually writing mode versus when the device 98 is simply moving in space. FIG. 5C is a graph depicting an example of the current output from a microfeeler-based detector subsystem 500.

Figure 6A:
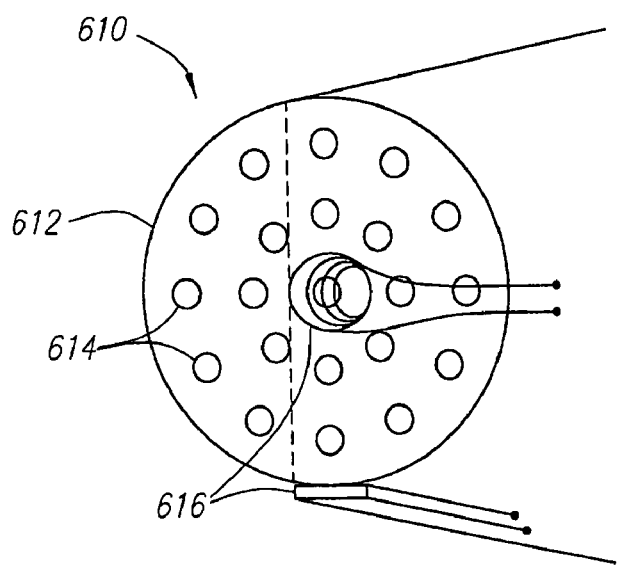
FIGS. 6A–C depict an alternative embodiments of the detection subsystem in the preferred pen-based writing storage device using induction coils to detect ball rotation.
Figure 6B:
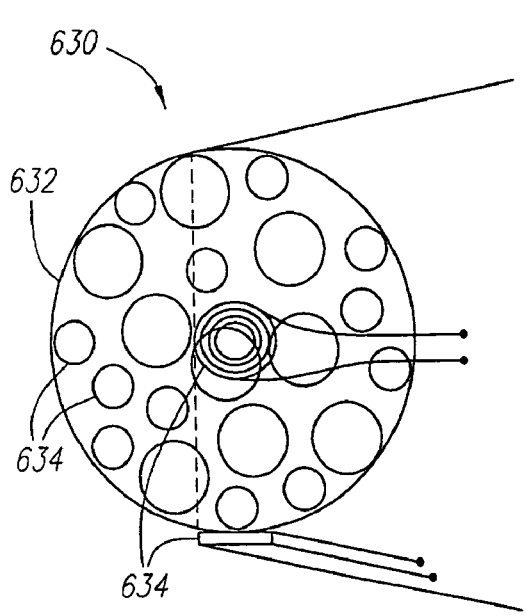
Figure 6C:
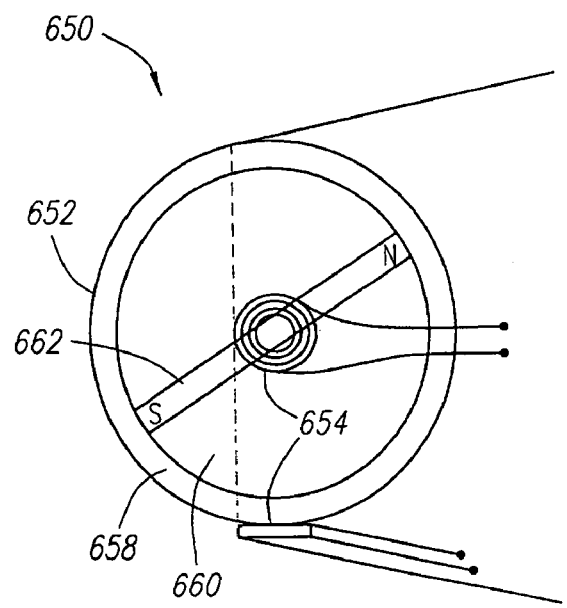

FIGS. 6A–C depict three embodiments centered around an impedance coil based detection subsystem 610, 630, 650. The first embodiment, illustrated in FIG. 6A, comprises a ball 612 in the tip of a pen, again similar to the kind used in a ball point pen, the ball 612 having magnetic domains 614 of the same relative size evenly distributed across its surface.

Figure 6D:
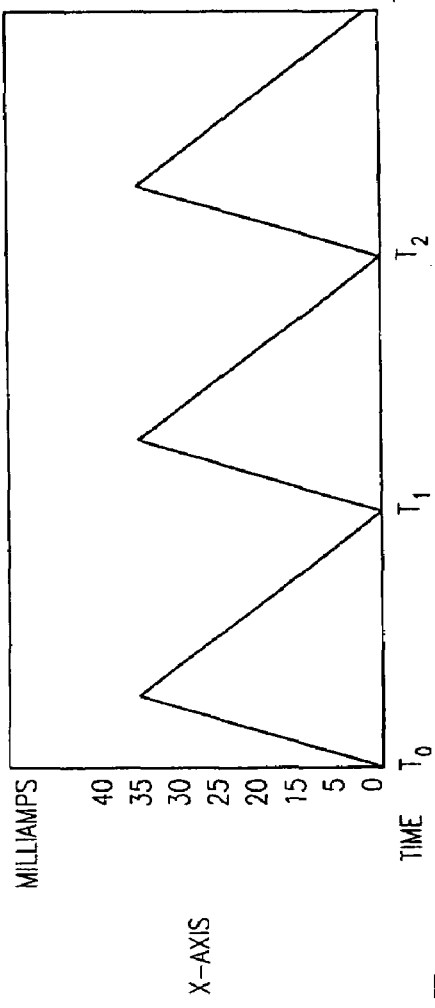
FIGS. 6D–F are graphs depicting examples of the current output from the alternative detection subsystems of FIGS. 6A–C, respectively.
Figure 6D:
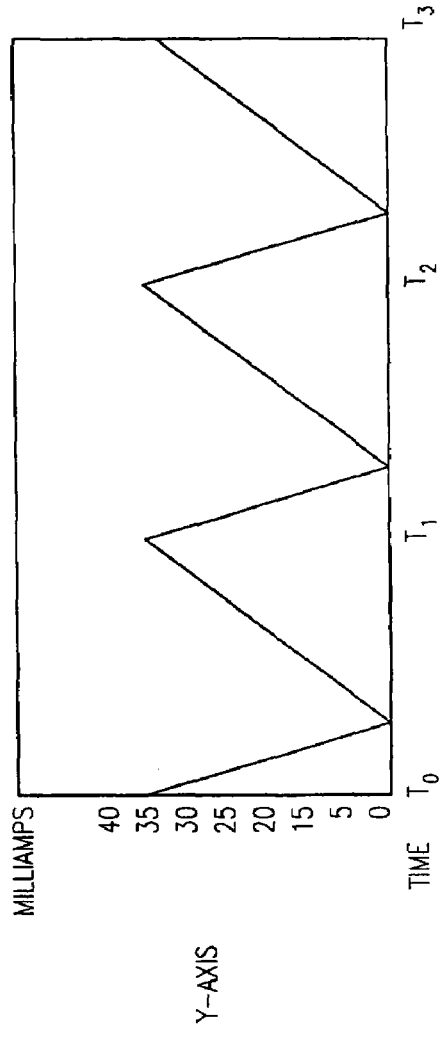

Induction coils 616 are coupled to the logic circuit of the device 98 and positioned just above the surface of the ball 612 without actually contacting it, the induction coils 616 having windings that are asymmetrically wound with linearly increasing space between the windings. Preferably, the induction coils 616 are positioned along a z-axis that runs through the center of the device 98 and near a great circumference of the ball 612 that is normal to the z-axis. Positioned thusly, the each induction coil 616 generates a current as the ball 612 rotates during writing and the magnetic domains 614 pass underneath. The current generated by each induction coil 616 enables measurement of ball rotation along two orthogonal axes. FIG. 6D is a graph depicting an example of the current output from an induction coil based detector subsystem 610.

Figure 6E:
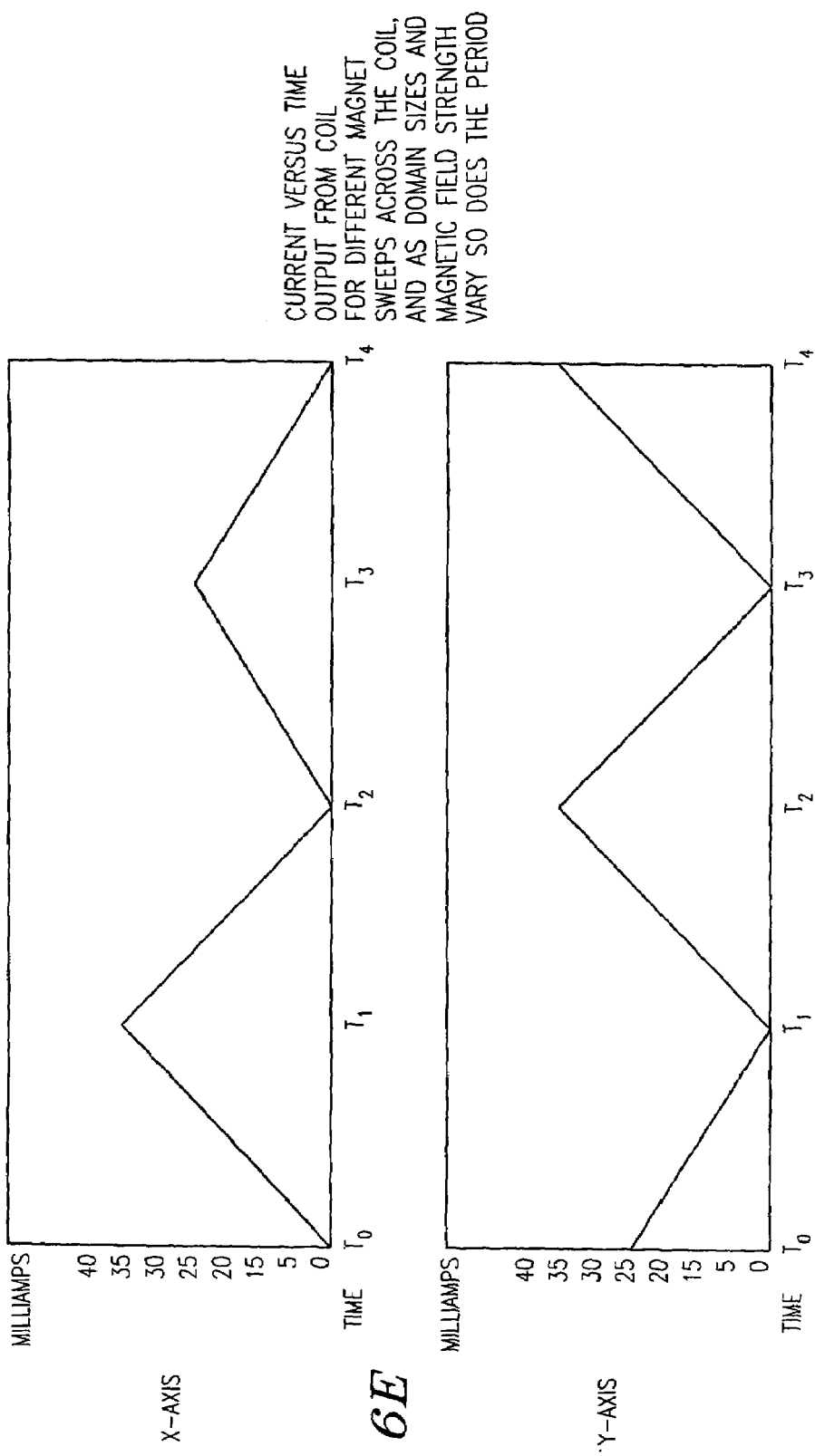
Figure 6F:
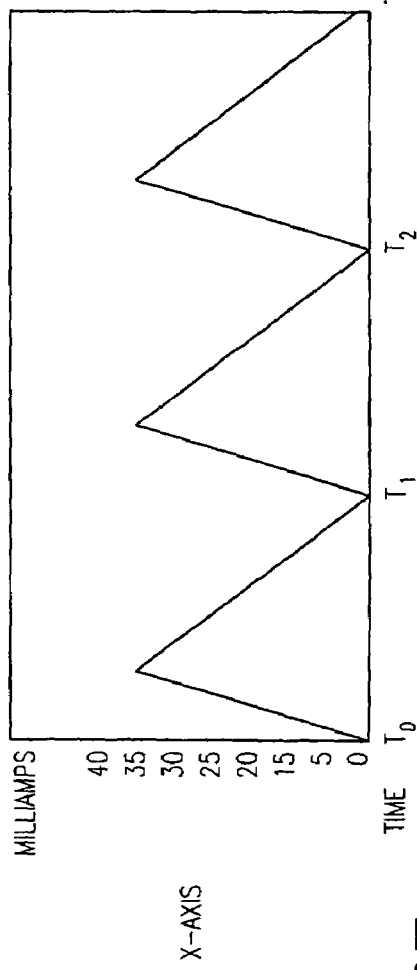
Figure 6F:
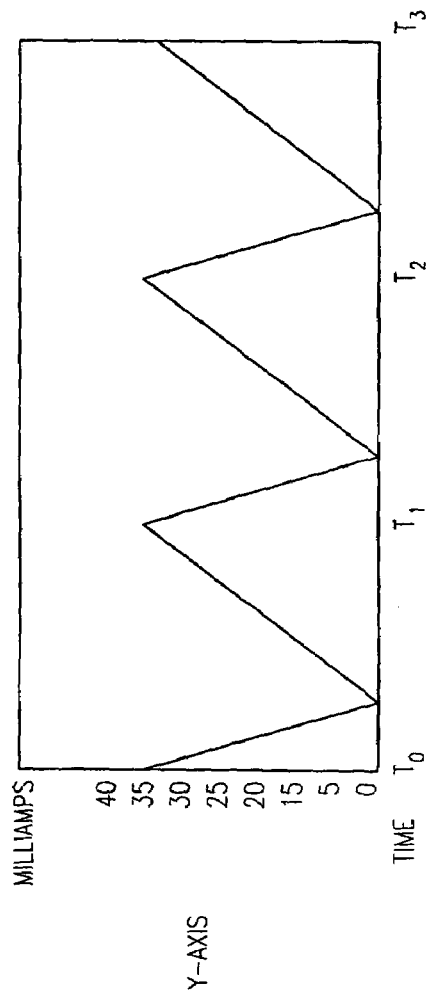

Alternative embodiments of impedance coil based detection subsystems 630, 650 are illustrated in FIGS. 6B and C. These embodiments differ from that depicted in FIG. 6A in the composition and distribution of the magnetic domains on the ball and in the windings of the induction coils. FIG. 6B illustrates a ball 632 having magnetic domains 634 that are non-uniform in size and are distributed in a characterized non-uniform pattern across the surface of the ball 632. Additionally, the induction coils 636 for this subsystem 630 are symmetrically wound with evenly spaced windings. FIG. 6E is a graph depicting an example of the current output from such an induction coil based detector subsystem 630. FIG. 6C illustrates an induction coil detector subsystem 650 having similarly symmetrically wound and evenly spaced induction coils 654 as in the subsystem 630 shown in FIG. 6B. However, the ball 652 in this subsystem 650 comprises a magnetized outer shell 658 over an inner ball 660, the outer shell 658 giving the ball 652 a single magnetic domain 662. FIG. 6F is a graph depicting an example of the current output from such an induction coil based detector subsystem 630.

Figure 7:
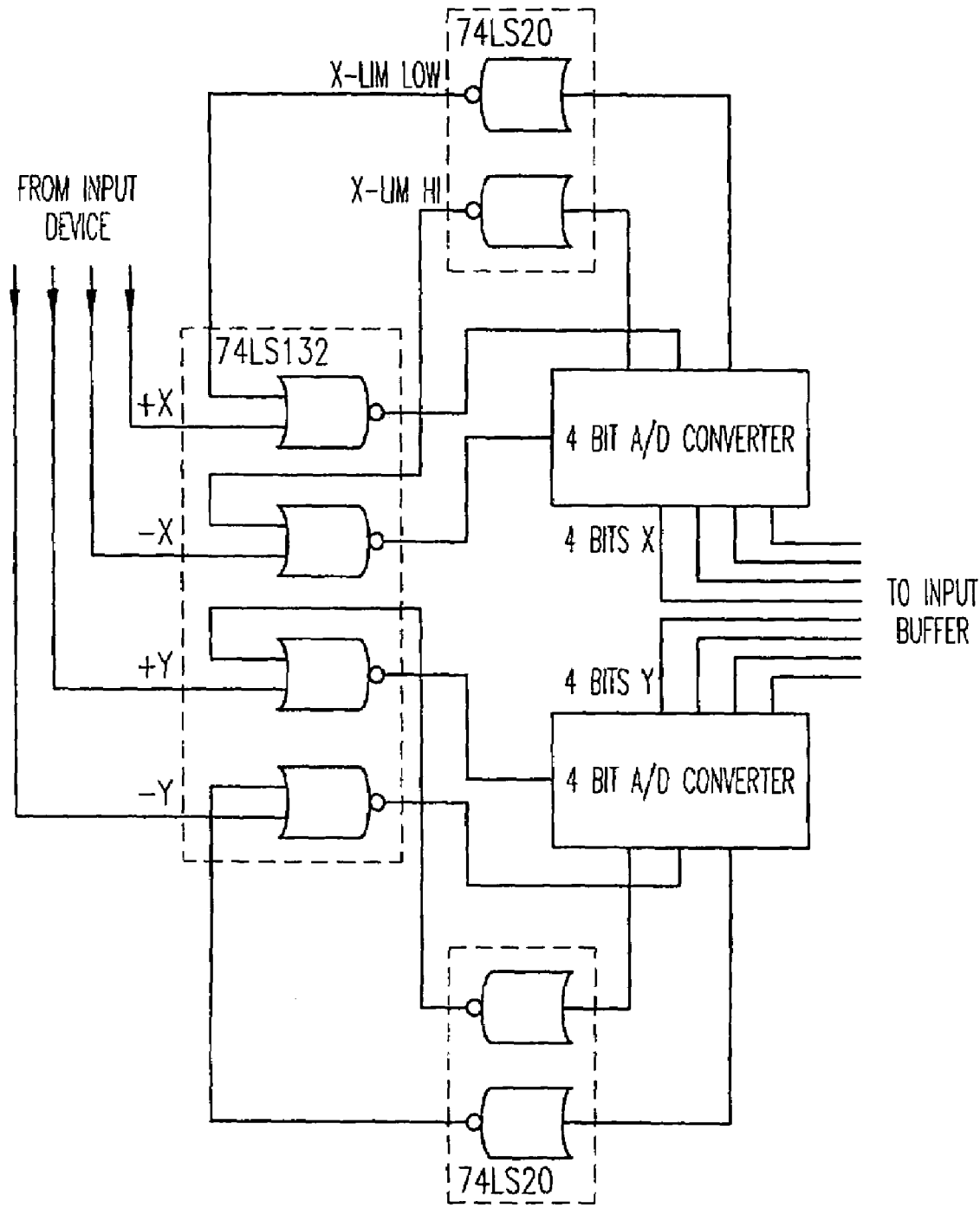
FIG. 7 is a schematic depicting a preferred embodiment of a circuit for processing microfeeler-based input as depicted in FIGS. 5A and 5B and induction coil input as depicted in FIGS. 5C–F.

FIG. 7 depicts a preferred embodiment of logic for interfacing the microfeeler based detection subsystem of FIGS. 5A–B and the impedance coil based detection subsystems of FIGS. 6A–C. In the preferred embodiment, four XOR and four NAND gates are used to process positive and negative X and Y movements of the pen tip.

Although the present invention has been described with reference to preferred embodiments, it will be readily appreciated to those of ordinary skill in the art that many modifications and adaptations of the invention are possible without departure from the spirit and scope of the invention as claimed hereinafter.

What is claim is:

1. A device for writing and processing handwriting comprising:
   a body;
   a marking element for making strokes comprising a character on a surface, wherein the marking element comprises a ball, the marking element being coupled to the body;
   a detector for detecting each stroke, and
   a processor coupled to the detector, wherein the detector and processor are disposed within the body; and
   wherein the detector comprises:
   at least one induction coil, wherein a first induction coil (a) is positioned adjacent to a first side of the ball, (b) senses ball movement using the plurality of discrete magnetic domains, (c) produces electronic signals based on the ball movement, and (d) sends the electronic signals to the processor; and
   a second induction coil, wherein said second induction coil (a) is positioned adjacent to a second side of the ball, (b) senses ball movement using the plurality of discrete magnetic domains, (c) produces electronic signals based on the ball movement, and (d) sends the electronic signals to the processor.

2. The device according to claim 1, further comprising an active feedback mechanism, wherein the detector detects the strokes at a periodic rate which is adjusted based on input from the active feedback mechanism.

3. The device of claim 1, wherein the processor identifies the character by combining the recognized strokes of the character and comparing the combined recognized strokes with a reference set of combined recognized strokes.

4. The device of claim 3, wherein the processor is comprised of a first sub-processor for characterizing each detected stroke as one in a set of reference strokes, and a second sub-processor for identifying the character, the first and second sub-processors functioning asynchronously.

5. The device of claim 1, wherein the processor characterizes each detected stroke as one in a set of reference strokes by representing each detected stroke as a polynomial representation, comparing the polynomial representation of each detected stroke with polynomial representations of the reference strokes, and selecting for each detected stroke a reference stroke whose polynomial representation is sufficiently similar to the polynomial representation of the detected stroke.

6. The device of claim 1, wherein the processor characterizes each detected stroke as one in a set of reference strokes by representing each detected stroke as a vector representation, comparing the vector representation of each detected stroke with vector representations of the reference strokes, and selecting for each detected stroke a reference stroke whose vector representation is sufficiently similar to the vector representation of the detected stroke.

7. The device of claim 1 further comprising a character output mechanism for outputting a signal representing the character.

8. The device of claim 1, wherein the detector detects the strokes in the temporal order that the strokes are made.

9. The device according to claim 1, wherein the ball comprises a plurality of discrete magnetic domains distributed over the surface of the ball.

10. The device according to claim 1, wherein the first side, the second side, and a z-axis are mutually orthogonal, wherein the z-axis passes through a center of the ball and is parallel to a major axis of the device.

11. The device according to claim 1, wherein the current changes are detected at a periodic rate which is adjusted based on input from an active feedback mechanism.

12. The device according to claim 1, wherein the detector detects quadrature elements using a feed-forward and feed-backward mechanism.

13. The device of claim 1, wherein the processor identifies the character by combining recognized quadrature elements of the character and comparing the combined recognized quadrature elements with a reference set of quadrature data.

14. The device of claim 1, wherein the processor identifies the character by comparing a recognized quadrature element with a reference set of quadrature data.

15. The device of claim 3, wherein the processor comprises a first processor for characterizing each detected stroke as a quadrature element using a set of reference quadrature elements, and a second processor for identifying the character, the first and second processor functioning asynchronously.

16. The device of claim 1, wherein the processor characterizes each detected stroke as a quadrature element as one in a set of reference quadrature elements by representing each detected stroke as a quadrature element selected from the group consisting of a basis vector, eigenvector, polynomial, Fast Fourier Transform function, and a combination of vector data and function translations.

17. The device of claim 1 further comprising a character storage mechanism for storing a signal representing the character.

* * * * *